(12) United States Patent
Fu

(10) Patent No.: US 10,469,836 B2
(45) Date of Patent: Nov. 5, 2019

(54) HEAD-MOUNTED DISPLAY DEVICE AND COMPUTER PROGRAM

(71) Applicant: SEIKO EPSON CORPORATION, Tokyo (JP)

(72) Inventor: Guoyi Fu, Vaughan (CA)

(73) Assignee: SEIKO EPSON CORPORATION, Tokyo (JP)

( * ) Notice: Subject to any disclaimer, the term of this patent is extended or adjusted under 35 U.S.C. 154(b) by 239 days.

(21) Appl. No.: 15/474,624

(22) Filed: Mar. 30, 2017

(65) Prior Publication Data

US 2017/0295360 A1 Oct. 12, 2017

(30) Foreign Application Priority Data

Apr. 7, 2016 (JP) .................................. 2016-077136

(51) Int. Cl.
| | |
|---|---|
| *G02B 27/01* | (2006.01) |
| *G06T 19/00* | (2011.01) |
| *G06T 7/593* | (2017.01) |
| *H04N 13/344* | (2018.01) |
| *H04N 13/398* | (2018.01) |
| *H04N 13/271* | (2018.01) |

(52) U.S. Cl.
CPC ......... *H04N 13/344* (2018.05); *G02B 27/017* (2013.01); *G02B 27/0172* (2013.01); *G06T 7/593* (2017.01); *G06T 19/006* (2013.01); *H04N 13/271* (2018.05); *H04N 13/398* (2018.05); *G02B 2027/014* (2013.01); *G02B 2027/0127* (2013.01); *G02B 2027/0134* (2013.01); *G02B 2027/0138* (2013.01)

(58) Field of Classification Search
CPC .... G02B 2027/0127; G02B 2027/0134; G02B 2027/0138; G02B 2027/014; G02B 27/017; G02B 27/0172; G06T 19/006; G06T 7/593; H04N 13/271; H04N 13/344; H04N 13/398
USPC .......................................................... 348/47
See application file for complete search history.

(56) References Cited

U.S. PATENT DOCUMENTS

| | | | |
|---|---|---|---|
| 2013/0095924 A1* | 4/2013 | Geisner .................. | G06F 3/012 463/32 |
| 2014/0125577 A1* | 5/2014 | Hoang .................... | G06F 3/017 345/156 |

(Continued)

FOREIGN PATENT DOCUMENTS

JP 2005-38321 A 2/2005

*Primary Examiner* — Deirdre L Beasley
(74) *Attorney, Agent, or Firm* — Oliff PLC

(57) ABSTRACT

A head-mounted display device includes a deriving section that derives an object distance of a real object included in an outside scene to be imaged and a relative pose of the real object with respect to an imaging section, a parameter selection section that selects one parameter group among a plurality of parameter groups for displaying an AR image associated with the real object on an image display section in accordance with the object distance; and a display image setting section that sets a display image in which a pose of the AR image and a pose of the real object are associated with each other, on the basis of the object distance, the relative pose of the real object, and the selected one parameter group, and displays the display image on the image display section.

8 Claims, 22 Drawing Sheets

(56) References Cited

U.S. PATENT DOCUMENTS

| | | | |
|---|---|---|---|
| 2016/0026253 A1* | 1/2016 | Bradski | G02B 27/225 345/8 |
| 2016/0148433 A1* | 5/2016 | Petrovskaya | G06T 19/006 345/633 |
| 2018/0176483 A1* | 6/2018 | Knorr | G06T 19/006 |

* cited by examiner

| OBJECT DISTANCE | PARAMETER GROUP | EXAMPLE OF SUITABLE OPERATION |
|---|---|---|
| 0m - 1m | PARAMETER GROUP PM1 | OPERATION WITHIN ARM'S REACH |
| 1m - 4m | PARAMETER GROUP PM2 | INDOOR OPERATION BEYOND THE USER'S HAND |
| MORE THAN 4m | PARAMETER GROUP PM3 | OUTDOOR OPERATION |

| DISPLAY MARKER IMAGE IMG | STRUCTURES OF ACTUAL MARKER AND MODEL MARKER |
|---|---|
| BOTH EYES / ALIGNMENT | 2D |
| SINGLE EYE / ALIGNMENT | 3D |

| POSITION AND POSE OF MODEL MARKER (MARKER IMAGE IMG) | PARAMETER TO BE ADJUSTED |
|---|---|
| FIXED TO DISPLAY SECTION | PARAMETER GROUP OTHER THAN CAMERA PARAMETER CP |
| SETTABLE BY USER (CUSTOMIZED ALIGNMENT) | PARAMETER GROUP |

FIG.24

HEAD-MOUNTED DISPLAY DEVICE AND COMPUTER PROGRAM

BACKGROUND

1. Technical Field

The present invention relates to a technique of a head-mounted display device.

2. Related Art

Hitherto, there has been known a head-mounted display device (HMD) which is worn on a user's head. For example, JP-A-2005-38321 discloses a video see-through type HMD in which an imaging section capable of imaging an outside scene through a supporting section slides up and down with respect to the HMD.

SUMMARY

When an image display apparatus including an optical see-through type head-mounted display device includes a technique of displaying an image at a position of a specific object, imaged by a camera, so as to be superposed thereon with a high level of accuracy, it is possible to provide improved convenience with respect to an AR (augmented reality) function. However, a distance between an imaging section and a specific object may vary, and there is room for improvement in setting various parameters that are used during the display of an image displayed in association with the specific object, in order to increase the accuracy of a display position of the image in an image display section.

An advantage of some aspects of the invention is to solve at least a part of the problems described above, and the invention can be implemented as the following forms or application examples.

(1) According to an aspect of the invention, a head-mounted display device is provided. The head-mounted display device includes a transparent type image display section, at least one of an imaging section that captures an image of an outside scene and a depth sensor, a deriving section that derives an object distance between a real object and one of the imaging section and the depth sensor, and an object pose of the real object with respect to one of the imaging section and the depth sensor, a parameter selecting section that selects a parameter group from among a plurality of predetermined parameter groups in response to input information or the derived object distance, each of the plurality of parameter groups being set for displaying an AR image corresponding to the real object on the image display section, and a display image setting section that sets a display image in which at least one of a position, a size, a pose and a depth perception of the AR image corresponds to at least one of a position, a size, a pose and a depth perception of the real object based on the derived object pose and the selected parameter group so as to be displayed on the image display section. According to the head-mounted display device of this aspect, the display image setting section can display an AR image on the image display section in association with a position of the real object, or the like with a high level of accuracy.

(2) In the head-mounted display device of the aspect, the imaging section may include a plurality of cameras disposed at different positions, and the deriving section may derive the object distance using a plurality of captured images captured with the plurality of cameras.

(3) In the head-mounted display device of the aspect, the image display section may include a left eye image display section and a right eye image display section. The image setting section may allow a user to visually perceive the display image as a stereoscopic image. Each of the plurality of parameter groups may include a camera parameter of the imaging section, a transformation parameter representing a spatial relationship between the imaging section and the image display section, and a projection transformation parameter for displaying the AR image based on a 3D model. According to the head-mounted display device of this aspect, the display image setting section can allow a user to recognize a depth perception of the display image by displaying an AR image as a stereoscopic image.

(4) In the head-mounted display device of the aspect, the plurality of parameter groups may include a first parameter group and a second parameter group, the first parameter group being set so as to be used in a case where a distance between the image display section and the real object is less than 4 m, and the second parameter group being set so as to be used in a case where the distance between the image display section and the real object is equal to or greater than 4 m. According to the head-mounted display device of this aspect, a parameter group according to an operation which is frequently performed by a user is set, and thus user convenience is improved.

(5) In the head-mounted display device of the aspect, the plurality of parameter groups may include a first parameter group and a second parameter group, the first parameter group being set so as to be used in a case where a distance between the image display section and the real object is less than 1 m, and the second parameter group being set so as to be used in a case where the distance between the image display section and the real object is equal to or greater than 1 m. According to the head-mounted display device of this aspect, a parameter group according to an operation which is frequently performed by a user is set, and thus user convenience is improved.

The invention can be implemented in various modes other than the head-mounted display device. For example, the invention can be implemented in modes such as an image display apparatus, a system including the image display apparatus, a computer program for implementing a method of controlling the image display apparatus and the system, a recording medium having the computer program recorded thereon, a data signal including the computer program and which is embodied within a carrier wave, or the like.

BRIEF DESCRIPTION OF THE DRAWINGS

The invention will be described with reference to the accompanying drawings, wherein like numbers reference like elements.

FIG. 24 illustrates tables showing elements related to parameters that are set in a first setting mode.

DESCRIPTION OF EXEMPLARY EMBODIMENTS

In this specification, a description will be given in order according to the following items.
A. First embodiment:
A-1. Configuration of Head-mounted display device:
A-2. Calibration Execution Process:
A-2-1. First Setting Mode:
A-2-2. Setting of Parameters:
A-2-2-1. With Regard to Camera Parameter:
A-2-2-2. With Regard to Transformation parameter:
A-2-2-3. Parameter Derivation Process:
A-2-2-4. Automatic Collection of Calibration Data:
A-2-3. Second Setting Mode:
A-3. AR image display process
B. Second embodiment:
C. Modification Example:

A. First Embodiment

Figure 1:
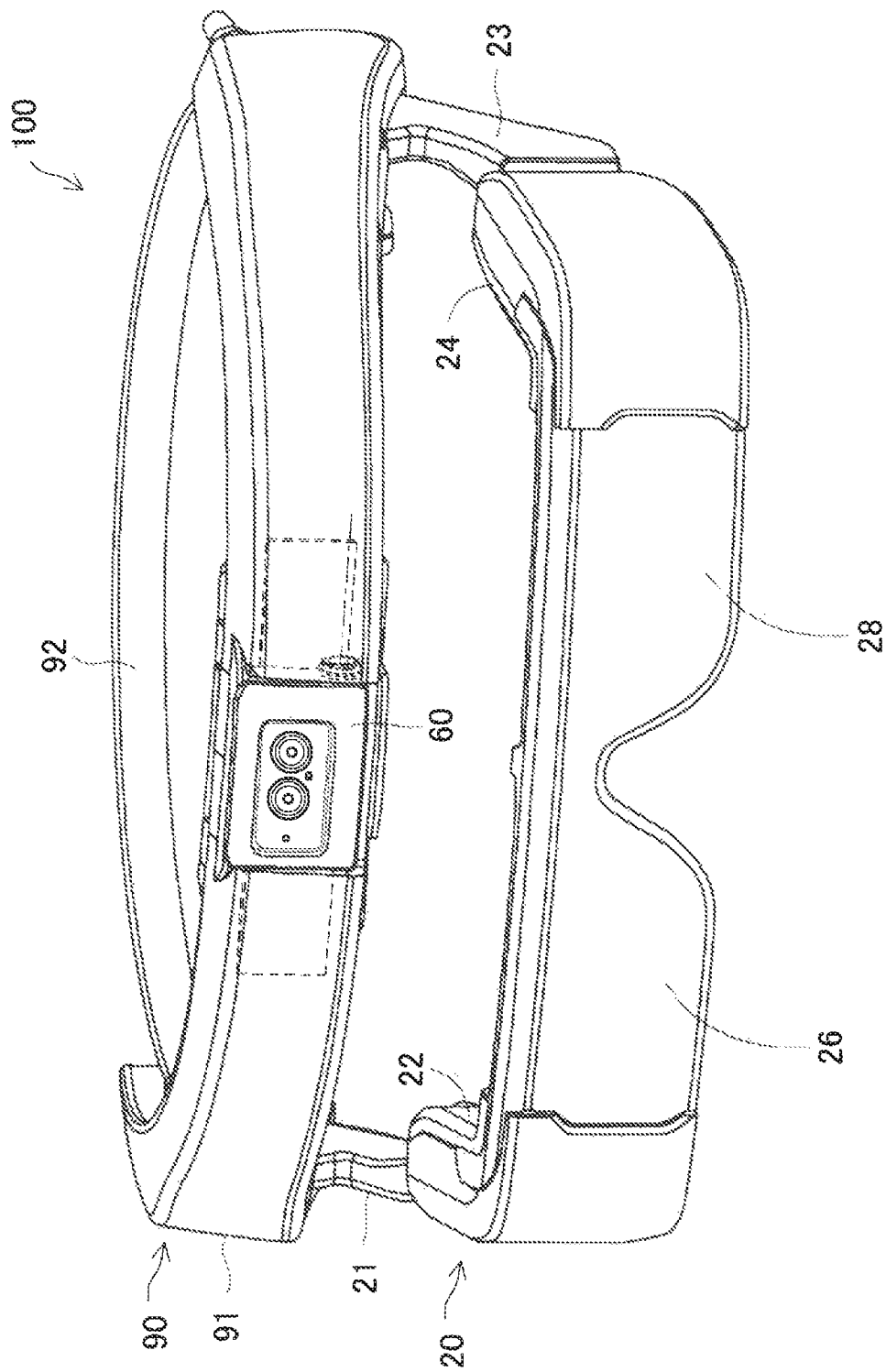
FIG. 1 is a diagram illustrating an exterior configuration of a head-mounted display device (HMD) that performs calibration.
Figure 2:
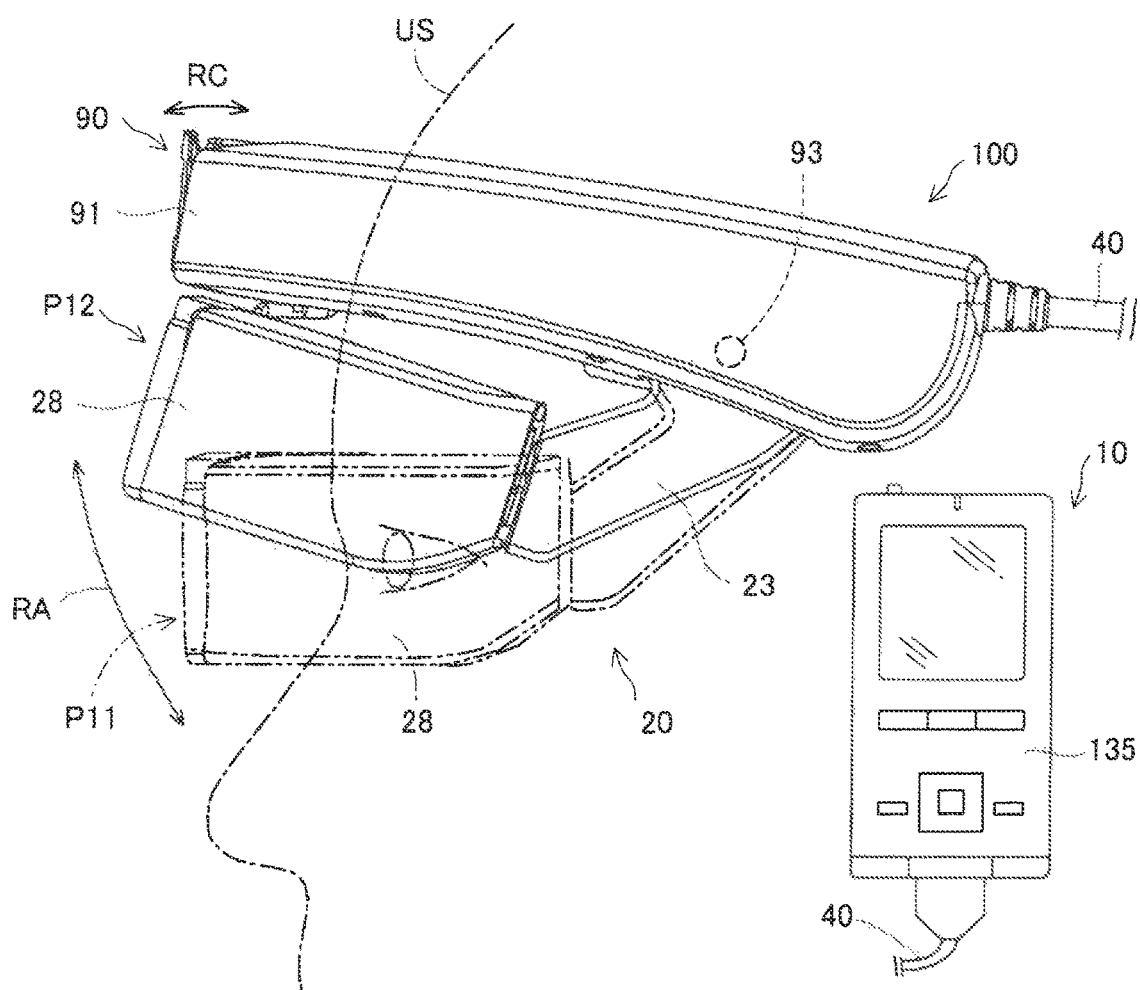
FIG. 2 is a diagram illustrating an exterior configuration of the head-mounted display device (HMD) that performs calibration.
Figure 3:
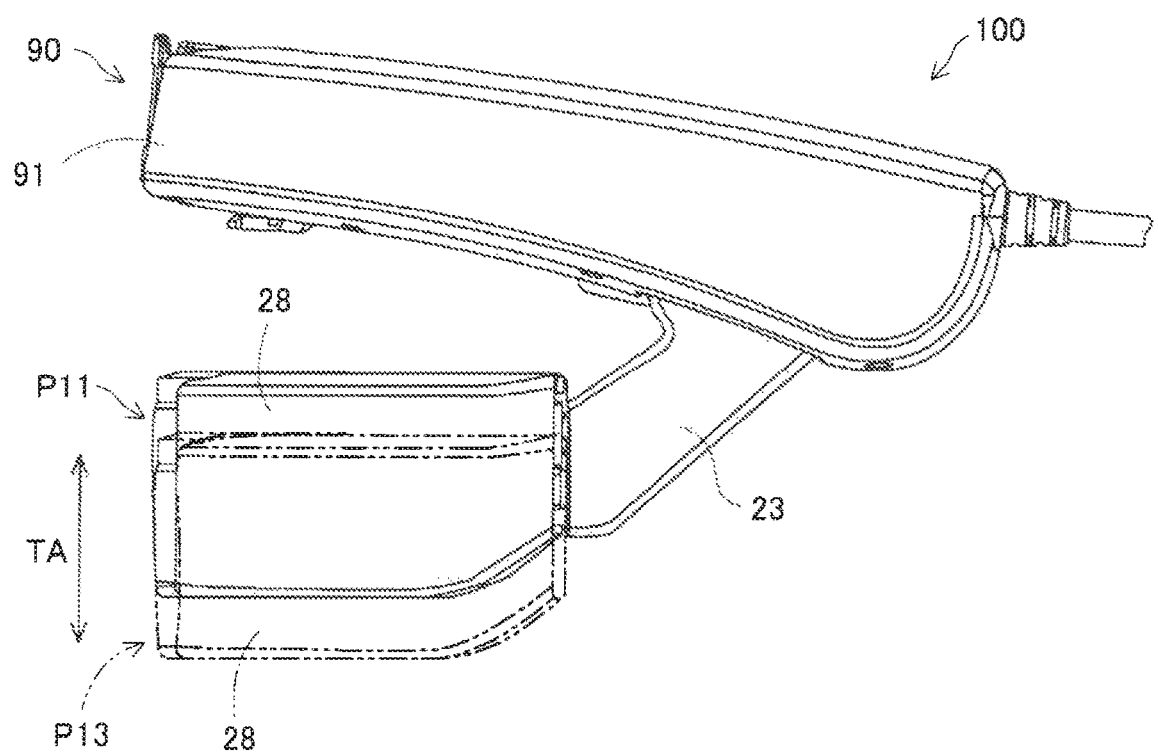
FIG. 3 is a diagram illustrating an exterior configuration of the head-mounted display device (HMD) that performs calibration.

A-1. Configuration of Head-Mounted Display Device:

FIGS. 1 to 3 are diagrams illustrating an exterior configuration of a head-mounted display device 100 (HMD 100) that performs calibration. The HMD 100 can make a user visually perceive a display image displayed on an image display section 20 and can make the user visually perceive an outside scene by light from the outside scene passing through the image display section 20 (FIG. 1). Although a detailed configuration thereof will be described later, the HMD 100 according to the present embodiment includes image display sections corresponding to the right and left eyes of a user wearing the image display section 20 to thereby allow the user's right and left eyes to visually perceive separate images.

As illustrated in FIG. 2, the HMD 100 includes a mounting band 90 mounted on the head-mounted display device of a user US, the image display section 20 connected to the mounting band 90, a control section 10 (controller 10) controlling the image display section 20, and a connection portion 40 connecting the control section 10 and the mounting band 90 to each other. As illustrated in FIG. 1, the mounting band 90 includes a mounting base portion 91 made of a resin, a belt portion 92 made of cloth and connected to the mounting base portion 91, and a camera 60. The mounting base portion 91 has a shape curved in accordance with the shape of a human's sinciput. The belt portion 92 is a belt to be mounted to the vicinity of a user's head. Meanwhile, the connection portion 40 connects the mounting band 90 and the control section 10 side to each other in a wired manner, but the connected portion therebetween is not illustrated in FIG. 2.

The camera 60 is a stereo camera capable of imaging an outside scene. The camera 60 is disposed at the central portion of the mounting base portion 91. In other words, the camera 60 is disposed at a position corresponding to the center of a user's forehead with the mounting band 90 mounted on the user's head. For this reason, the camera 60 images an outside scene which is scenery on the outside in a direction of a user's eye gaze direction in a state where the user wears the mounting band 90 on his or her head, and acquires the captured image. As illustrated in FIG. 2, the camera 60 is movable with respect to the mounting base portion 91 in a predetermined range along an arc RC. In other words, the camera 60 can change an imaging range in a predetermined range.

As illustrated in FIG. 2, the image display section 20 is connected to the mounting base portion 91 through a coupling portion 93 and has a shape of a pair of spectacles. The coupling portions 93 are respectively disposed on both sides of the mounting base portion 91 and the image display section 20 so as to be symmetrical to each other, and the position of the image display section 20 with respect to the mounting base portion 91 is movably supported along the arc RA centering on the coupling portion 93. In FIG. 2, a position P11 indicated by a two-dot chain line is the lowermost position of the image display section 20 along the arc RA. In addition, a position P12 indicated by a solid line in FIG. 2 is the uppermost position of the image display section 20 along the arc RA.

In addition, as illustrated in FIGS. 1 and 3, optical image display sections 26 and 28 including a display panel capable of displaying an image move in parallel with holding sections 21 and 23 along a straight line TA in a predetermined range to thereby change their positions. In FIG. 3, a position P13 indicated by a two-dot chain line is the lowermost position of the optical image display sections 26 and 28 along the straight line TA. In FIG. 3, a position P11 indicated by a solid line is the uppermost position of the optical image display sections 26 and 28 along the straight line TA. Meanwhile, the position P11 in FIG. 2 and the position P11 in FIG. 3 indicate the same position.

As illustrated in FIG. 1, the image display section 20 includes the right holding section 21, a right display driving section 22, the left holding section 23, a left display driving section 24, the right optical image display section 26, and the left optical image display section 28. The right optical image display section 26 and the left optical image display section 28 are disposed so as to be positioned in front of a user's right and left eyes, respectively, when the user wears the image display section 20. An end of the right optical image display section 26 and an end of the left optical image display section 28 are connected to each other at a position corresponding to a user's glabella when the user wears the image display section 20.

The right holding section 21 is a member which is provided so as to extend to the coupling portion 93 connected to the mounting base portion 91 from the other end of the right optical image display section 26. Similarly, the left holding section 23 is a member which is provided so as to extend to the coupling portion 93 from the other end of the left optical image display section 28. The right display driving section 22 and the left display driving section 24 are disposed on sides corresponding to a user's head when the user wears the image display section 20.

The display driving sections 22 and 24 include liquid crystal displays 241 and 242 (hereinafter, also referred to as "LCDs 241 and 242") to be described later in FIG. 2, projection optical systems 251 and 252, and the like. Configurations of the display driving sections 22 and 24 will be described in detail later. The optical image display sections 26 and 28 include light guiding plates 261 and 262 (see FIG. 4) and a light control plate which will be described later. The light guiding plates 261 and 262 is formed of a light transmissive resin material or the like, and guide image light which is output from the display driving sections 22 and 24 to a user's eyes. The light control plate is an optical element having a thin plate shape, and is disposed so as to cover the front side of the image display section 20 which is opposite to a side of a user's eyes. The light transmittance of the light control plate is adjusted, and thus it is possible to adjust the easiness of visual recognition of an imaginary image by adjusting the amount of external light entering a user's eyes.

The control section 10 is an apparatus for controlling the HMD 100. The control section 10 includes an operation input section 135 including an electrostatic track pad, a plurality of buttons capable of being pressed, or the like.

Figure 4:
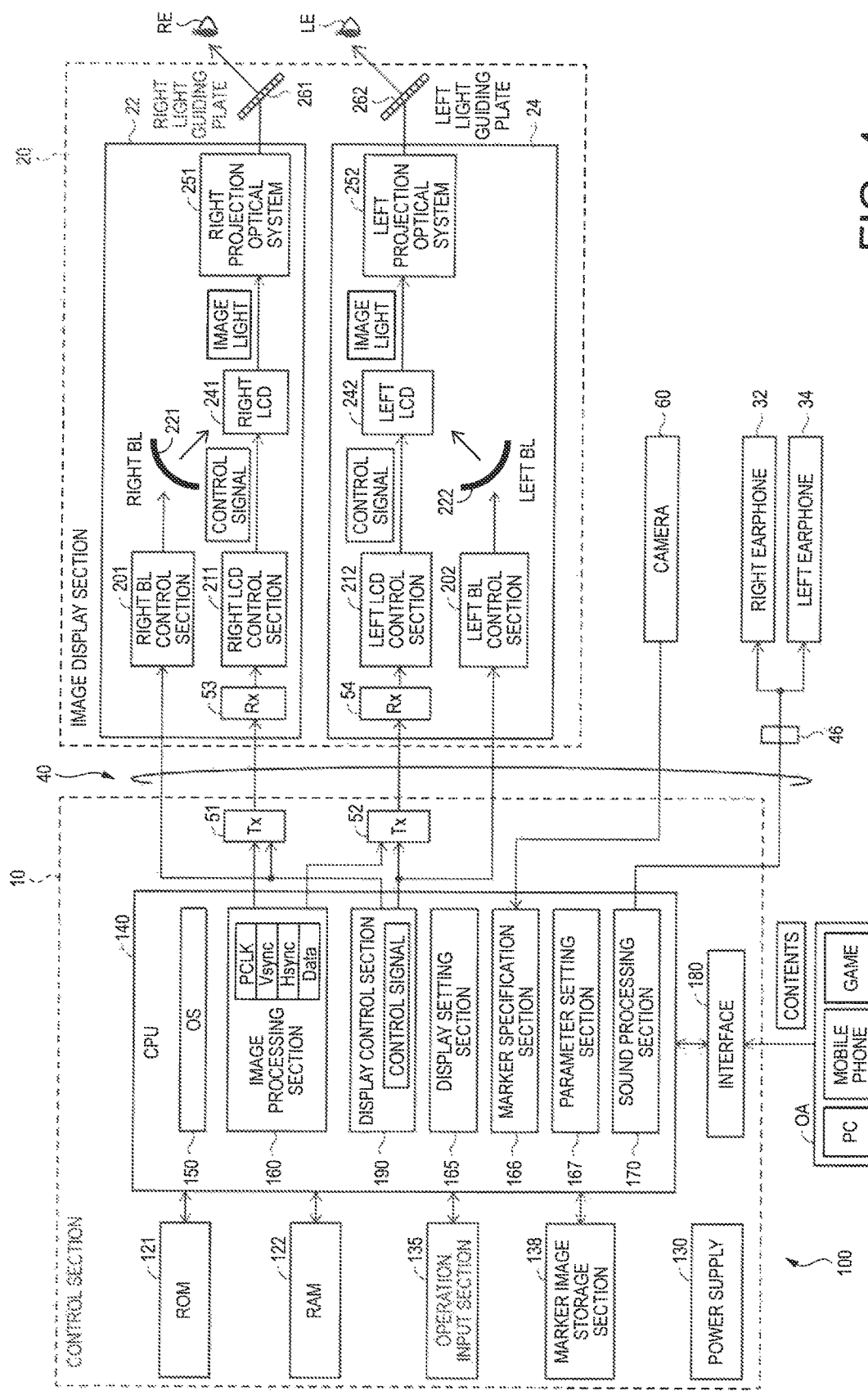
FIG. 4 is a functional block diagram illustrating a configuration of an HMD.

FIG. 4 is a functional block diagram illustrating a configuration of the HMD 100. As illustrated in FIG. 4, the control section 10 includes a ROM 121, a RAM 122, a power supply 130, an operation input section 135, a marker image storage section 138, a CPU 140, an interface 180, a transmission section 51 (Tx51), and a transmission section 52 (Tx52).

The power supply 130 supplies power to each section of the HMD 100. The ROM 121 stores various computer programs. The CPU 140 to be described later expands various types of computer programs stored in the ROM 121 to the RAM 122 to thereby execute the various types of computer programs.

The marker image storage section 138 stores data of a model marker (also referred to as a marker model) which is used for calibration and/or a marker image IMG as an image for calibration which is displayed on the right optical image display section 26 or the left optical image display section 28. The marker image storage section 138 may store a marker image displayed on the right optical image display section 26 and a marker image displayed on the left optical image display section 28 as the same marker image IMG. Examples of the marker image IMG to be used include an image of a two-dimensional model marker, data of the above-mentioned model marker (2D) expressed in a three-dimensional model space (3D computer graphic space), or the model marker which is projected on the basis of a projection parameter of each of the right optical image display section 26 or the left optical image display section 28. In other words, the marker image IMG is an image obtained by two-dimensionally expressing the shape of a two-dimensional or three-dimensional real marker MK1 which is present as a real object. Meanwhile, the real marker MK1 corresponds to an identification marker in the appended claims.

The marker image storage section 138 stores three-dimensional models of a plurality of specific objects other than a model marker and AR images corresponding to the plurality of specific objects. When a specific object is included in an outside scene as an object to be imaged by the camera 60, a display image setting section 165 to be described later displays an AR image corresponding to the imaged specific object on the optical image display sections 26 and 28.

Figure 5:
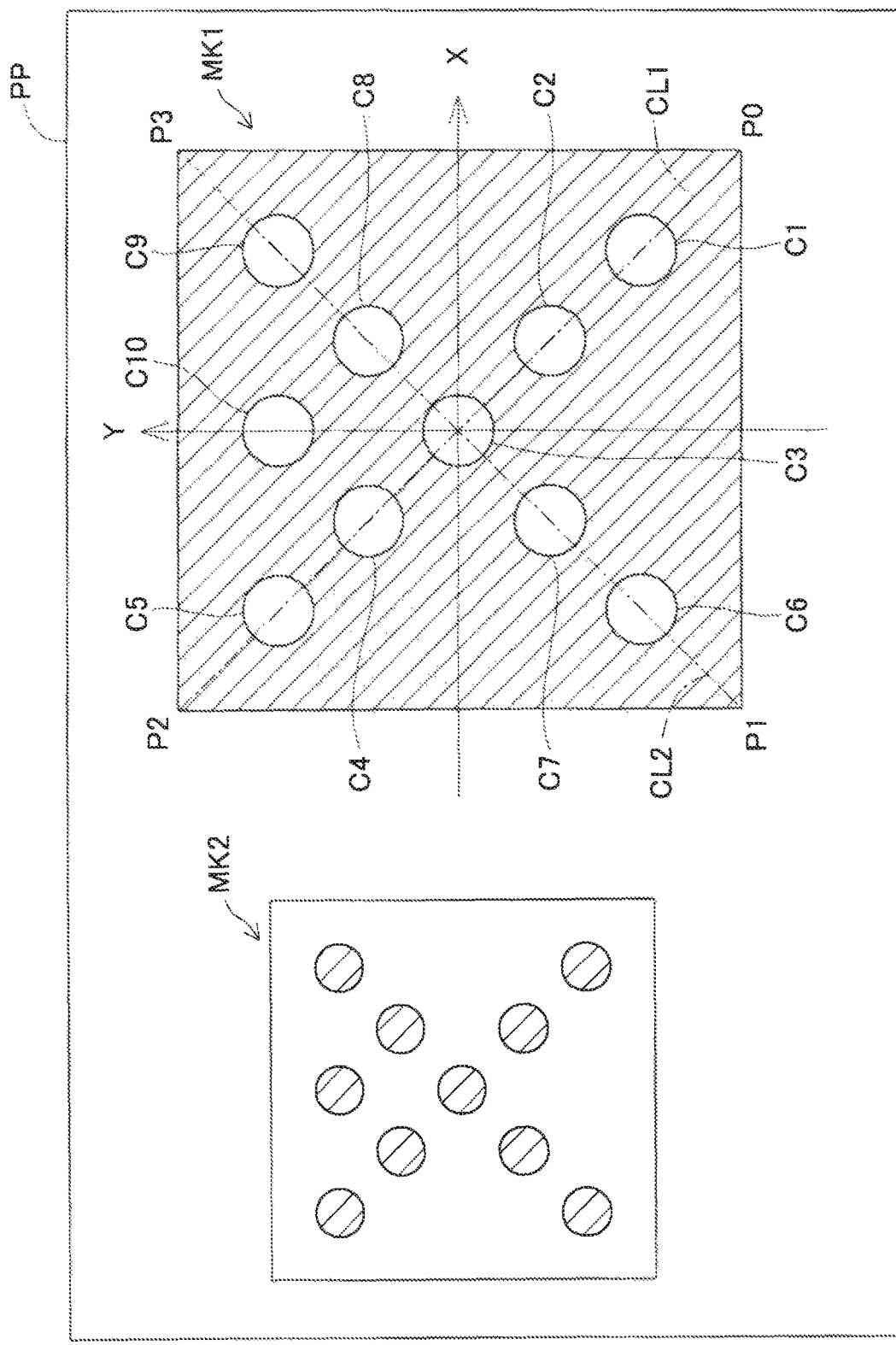
FIG. 5 is a diagram illustrating two-dimensional real markers printed on paper.

FIGS. 5 to 8 are diagrams illustrating two-dimensional real markers printed on paper PP. FIG. 5 illustrates real markers MK1 and MK2 as two markers that are used for calibration according to the present embodiment. As illustrated in FIG. 5, the real marker MK1 is a marker including ten circles in a square formed by connecting four vertexes P0, P1, P2, and P3 by a straight line. The centers of five circles among the ten circles are present on a diagonal line CL1 connecting the vertex P0 and the vertex P2. The five circles are circles C1, C2, C3, C4, and C5 from a circle close to the vertex P0 along the diagonal line CL1. Similarly, the centers of five circles among the ten circles are present on a diagonal line CL2 connecting the vertex P1 and the vertex P3. The five circles are circles C6, C7, C3, C8, and C9 from a circle close to the vertex P1 along the diagonal line CL2. The circle C3 is on an intersection between the diagonal line CL1 and the diagonal line CL2 and is a circle centering on a point which is the centroid of the square. A circle C10, which is one circle among the ten circles, has its center on the Y axis that passes through the centroid of the square and is parallel to a straight line connecting P1 and P2. The circle C10 has its center at the same position as those of the circles C5 and C9 along the X axis that passes through the centroid of the square and is perpendicular to the Y-axis. In other words, the circle C10 is a circle having its center between the center of the circle C5 and the center of the circle C9.

In the present embodiment, distances between the centers of circles adjacent to each other in five circles having the center on the diagonal line CL1 are set to be the same as each other. Similarly, distances between the centers of circles adjacent to each other in five circles having the center on the diagonal line CL2 are set to be the same as each other. In addition, a distance between the centers of circles, having the center on the diagonal line CL1, which are adjacent to each other and a distance between the centers of circles, having the center on the diagonal line CL2 are the same distance. Meanwhile, only the circle C10 among the ten circles differs from the other circles in a distance between the center thereof and the center of each of the other circles. The sizes of the ten circles are the same as each other.

Meanwhile, the diagonal line CL1, the diagonal line CL2, the X-axis, and the Y-axis are illustrated in FIG. 5 for convenience of description of the real marker MK1, and are straight lines that are not included in a real real marker MK1.

In FIG. 5, a difference in color is illustrated by changing hatching. Specifically, a hatched portion in FIG. 5 is black in color, and the other portions are white in color. For this reason, as illustrated in FIG. 5, the real marker MK1 is formed of a black square, which is surrounded with a white color, on white paper PP, and white ten circles are formed in the square.

Figure 6:
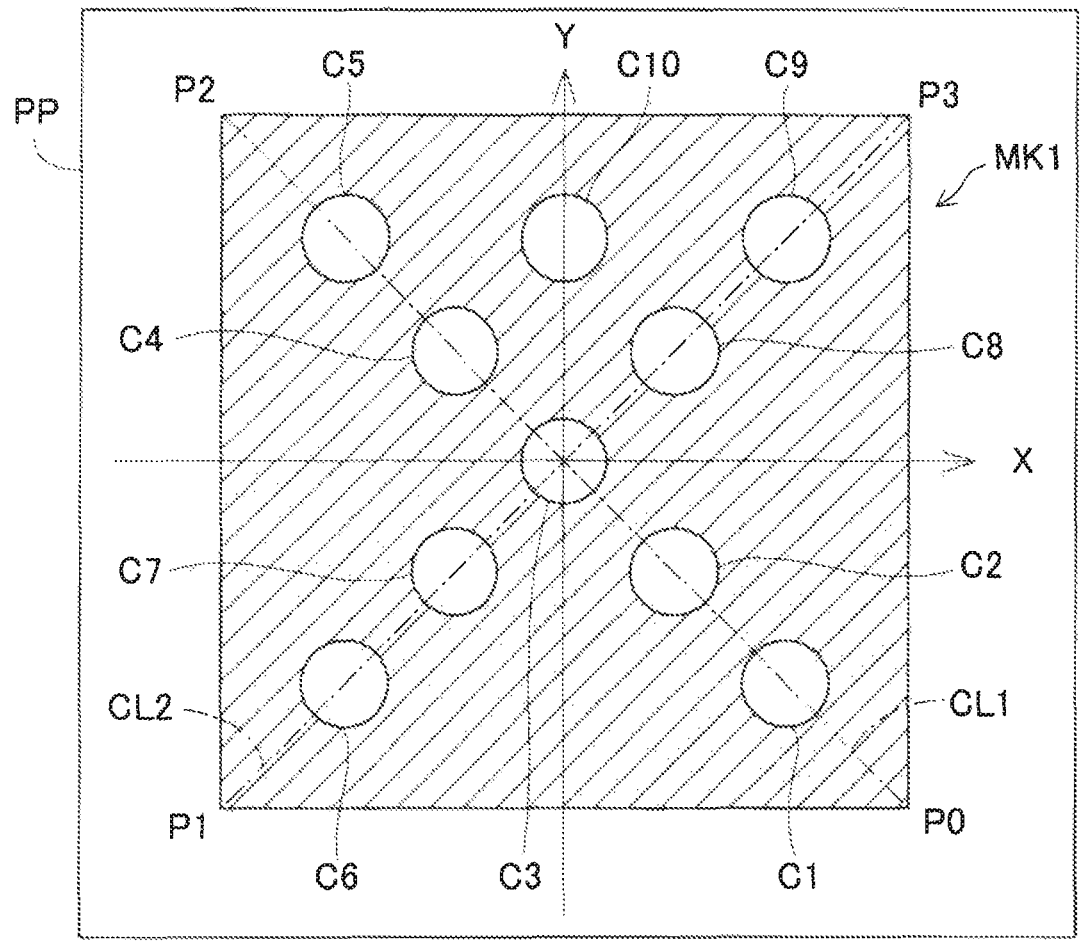
FIG. 6 is a diagram illustrating a two-dimensional real marker printed on paper.
Figure 7:
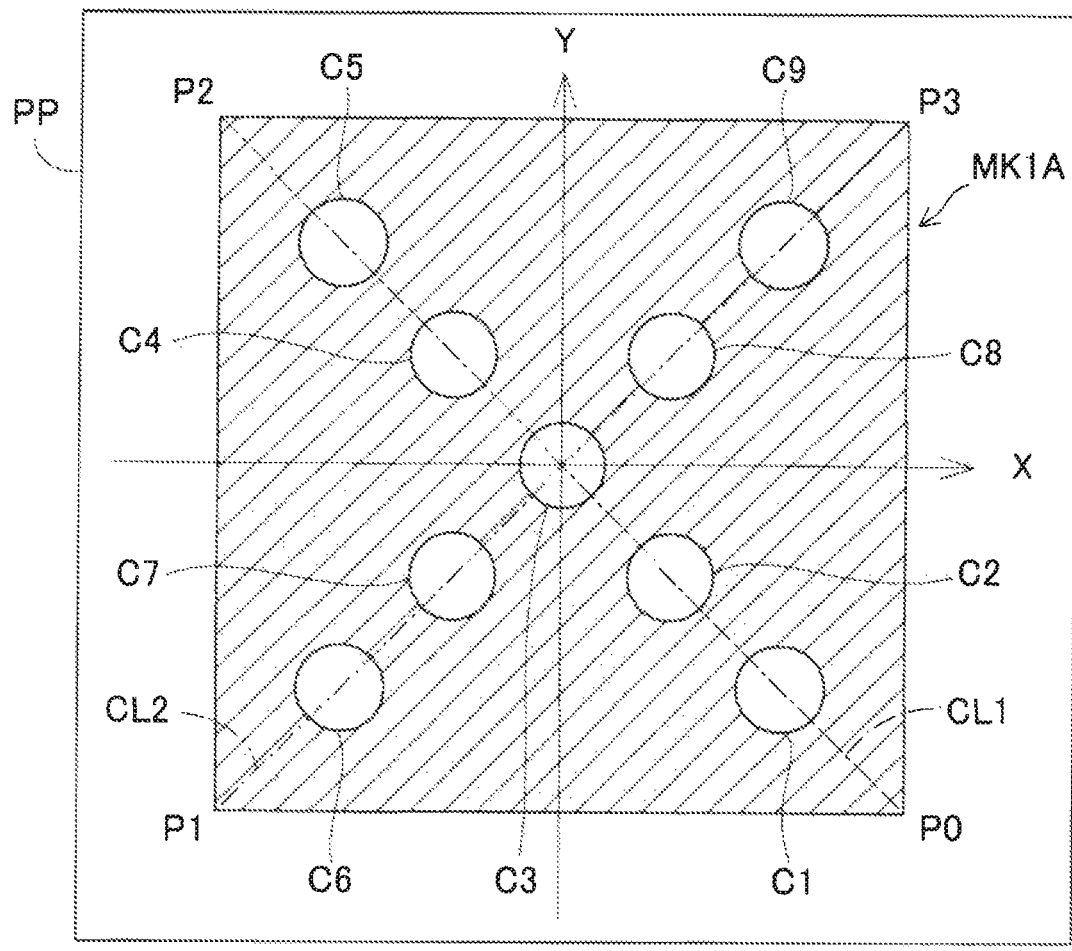
FIG. 7 is a diagram illustrating a two-dimensional real marker printed on paper.
Figure 8:
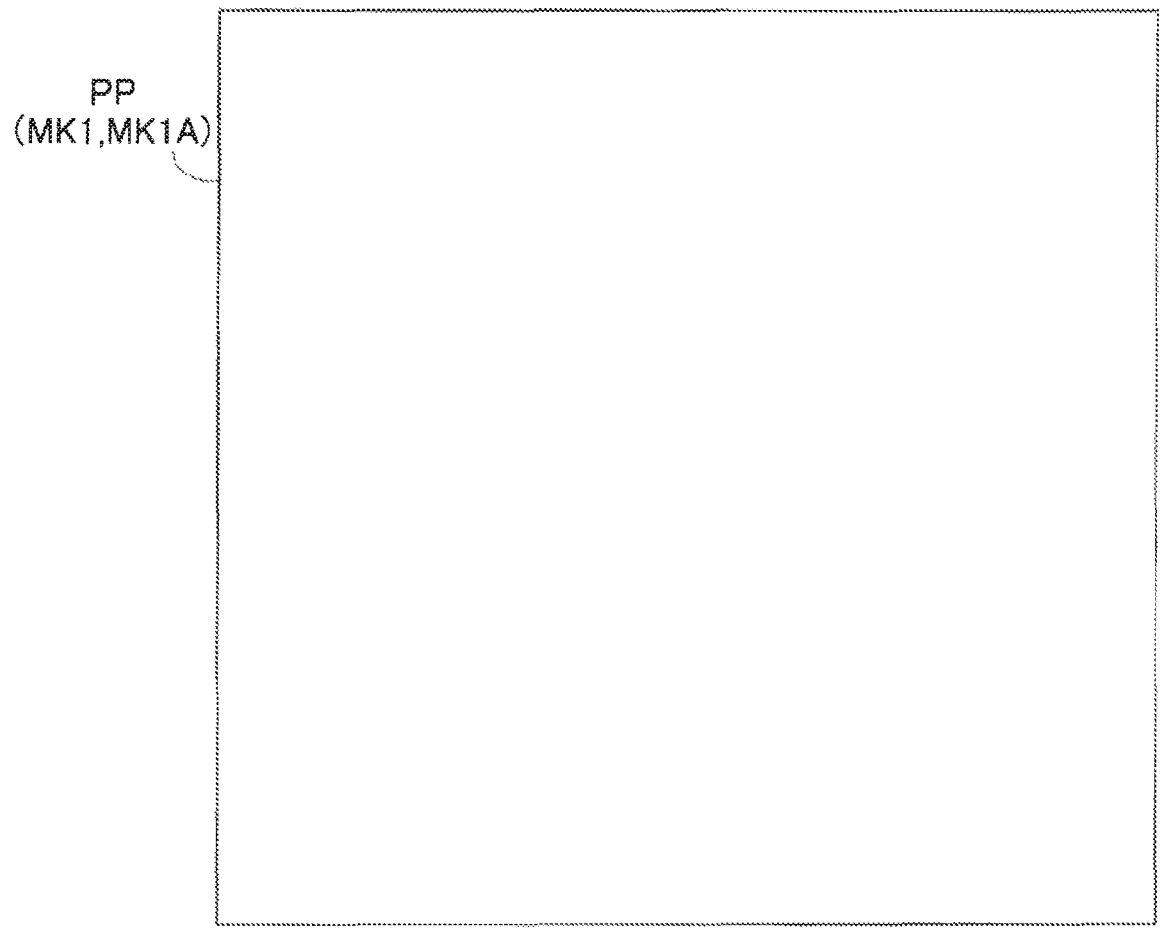
FIG. 8 is a diagram illustrating two-dimensional real markers printed on paper.

The real marker MK2 illustrated in FIG. 5 is a marker which is created on the basis of the real marker MK1. The real marker MK2 is a marker obtained by reducing the size of the real marker MK1 and reversing a black color and a white color. For this reason, as illustrated in FIG. 5, the real marker MK2 is formed by a white square surrounded by a black color (as illustrated with a black line), and black ten circles are formed in the square. In the present embodiment, the marker image storage section 138 stores a marker image IMG which is a two-dimensional image of the real marker MK1. Meanwhile, as illustrated in FIG. 6, a real marker MK2 may be separated from a real marker MK1. In addition, as illustrated in FIG. 7, a real marker MK1A that does not include a circle, which is not present on a diagonal line, may be adopted instead of a real marker MK2 (MK1). Meanwhile, as illustrated in FIG. 8, the rear faces of real markers MK1, MK2, and MK1A are not required to have features of a shape, a pattern, or a color.

The CPU 140 illustrated in FIG. 4 expands computer programs stored in the ROM 121 to the RAM 122 to thereby function as an operating system 150 (OS 150), a display control section 190, a sound processing section 170, an image processing section 160, a display image setting section 165, a marker specification section 166, and a parameter setting section 167.

The display control section 190 generates a control signal for controlling the right display driving section 22 and the left display driving section 24. The display control section 190 controls the generation and emission of image light by each of the right display driving section 22 and the left display driving section 24. The display control section 190 transmits each of control signals for a right LCD control section 211 and a left LCD control section 212 through the transmission sections 51 and 52. In addition, the display control section 190 transmits each of control signals for a right backlight control section 201 and a left backlight control section 202.

The image processing section 160 acquires an image signal included in contents, and transmits the acquired image signal to reception sections 53 and 54 of the image display section 20 through the transmission sections 51 and 52. The sound processing section 170 acquires a sound signal included in contents, amplifies the acquired sound signal, and provides the amplified signal to a speaker (not illustrated) within a right earphone 32 and a speaker (not illustrated) within a left earphone 34 which are connected to a coupling member 46.

The display image setting section 165 displays a marker image IMG based on the data stored in the marker image storage section 138 on the right optical image display section 26 or the left optical image display section 28. When calibration is executed (during the execution of calibration), the display image setting section 165 controls a case where the marker image IMG is displayed on the right optical image display section 26 and a case where the marker image IMG is displayed on the left optical image display section 28 on the basis of an operation received by the operation input section 135. The display image setting section 165 displays marker images IMG, which having different sizes when the camera 60 images the real marker MK1 and executes calibration and when the camera 60 images the real marker MK2 and executes calibration, on the right optical image display section 26 or the left optical image display section 28. In addition, the display image setting section 165 displays a character image to be described later, or the like on the optical image display sections 26 and 28 during the execution of calibration.

In a case where a captured image obtained by the camera 60 includes paper PP on which the real markers MK1 and MK2 are printed, the marker specification section 166 specifies the real markers MK1 and MK2 from the imaged paper PP. Although a specific process for specifying the real markers MK1 and MK2 will be described later, the marker specification section 166 extracts coordinate values of four vertexes and the centers of ten circles of the real markers MK1 and MK2 to thereby specify the real markers MK1 and MK2 from the captured image. For example, the marker specification section 166 distinguishes between black and white portions in the real markers MK1 and MK2 by binarizing a gradation value of the color of the captured image to thereby extract coordinates of the centers of the circles.

The parameter setting section 167 sets parameter groups required to set the position of an augmented reality (AR) image, which is displayed on the optical image display sections 26 and 28 in a state of being associated with a specific object imaged by the camera 60 (hereinafter, also referred to as a "specific object"), and the like within a display region. Specifically, the parameter setting section 167 sets parameter groups for making a user US visually perceive the AR image in a state where at least one of the position, size, and orientation of the AR image displayed on the optical image display sections 26 and 28 is associated with at least one of the position, size, and orientation of the specific object. In other words, the parameter setting section 167 calculates at least one of the parameter groups for associating a three-dimensional coordinate system (3D) having the origin fixed to the camera 60 with a display region (2D) of the optical image display sections 26 and 28, by calibration. Meanwhile, hereinafter, a three-dimensional coordinate system having the origin fixed to the camera 60 is referred to as a camera coordinate system. In the present embodiment, as a coordinate system other than the camera coordinate system, a real marker coordinate system having the origin of the real marker MK1 or the real marker MK2 as a reference, an object coordinate system having a specific object imaged by the camera 60 as a reference, a display section coordinate system having the origin of the right optical image display section 26 or the origin of the left optical image display section 28 as a reference, and the like are defined. The parameter setting section 167 corresponds to a deriving section in the appended claims.

The parameter setting section 167 can calculate an object distance from the camera 60 to a specific object included in an outside scene as an object to be imaged, on the basis of trigonometry using two captured images of the camera 60. In addition, the parameter setting section 167 sets a plurality of parameter groups in accordance with the object distance or input information which is input through the operation input section 135. The details thereof will be described later. For example, the parameter setting section 167 sets a first parameter group PM1, a second parameter group PM2, and a third parameter group PM3 (hereinafter, also collectively referred to as "parameter groups PM1, PM2, and PM3") as parameter groups respectively corresponding to three cases of a case where an object distance is equal to or greater than 0.5 meter (m) and less than 1 m, a case where an object distance is equal to or greater than 1 m and less than 4 m, and a case where an object distance is equal to or greater than 4 m. The parameter setting section 167 selects a parameter group corresponding to an object distance. The display image setting section 165 displays an image associated with a specific object on the optical image display sections 26 and 28 using the selected parameter group. Since a positional relationship between the camera 60 and the image display section 20 (optical image display sections 26 and 28) is known already when an object distance between the camera 60 and the specific object can be specified, a distance between the image display section 20 and the specific object is calculated.

Here, the parameter group includes a "detection system parameter set" and a "display system parameter set". The "detection system parameter set" includes a camera parameter CP regarding the camera 60. The "display system parameter set" includes a "transformation parameter" from 3D to 3D which indicates a spatial relationship between the camera 60 and the optical image display sections 26 and 28 and a "projection parameter" from 3D to 2D for displaying any 3D model (CG model expressed by three-dimensional coordinates) as an image (that is, 2D). In a plurality of parameters that are set in accordance with an object distance, a difference in a "display system parameter set" is particularly great, and a parameter related to the depth of a display image is more significantly different than other parameters. These parameters are expressed in a mode of a matrix or a vector as necessary. The notation of "one parameter" may indicate one matrix or one vector, or may indicate one of a plurality of elements included in one matrix or one vector. The parameter setting section 167 derives necessary parameters in a parameter group and uses the derived parameters during the display of an AR image. As a result, the HMD 100 can make a user US visually perceive the AR image through the image display section 20 in a state where at least one of the position, size, orientation, and depth perception of the AR image (AR model) is substantially aligned with those of a specific object. In addition to these, the HMD 100 may make appearances such as color or texture aligned with each other.

When calibration is executed, the display image setting section 165 displays an AR image or a setting image SIM (to be described later) on the right optical image display section 26 or the left optical image display section 28. A detailed process using the setting image SIM will be described later.

The interface 180 is an interface for connecting various external devices OA serving as content supply sources to the control section 10. Examples of the external device OA include a storage device storing an AR scenario, a personal computer (PC), a mobile phone terminal, a game terminal, and the like. Examples of the interface 180 may include a USB interface, a micro USB interface, an interface for a memory card, and the like.

As illustrated in FIG. 4, the image display section 20 includes the right display driving section 22, the left display driving section 24, the right light guiding plate 261 as the right optical image display section 26, and the left light guiding plate 262 as the left optical image display section 28.

The right display driving section 22 includes the reception section 53 (Rx53), the right backlight control section 201 (right BL control section 201) and a right backlight 221 (right BL 221) which function as a light source, the right LCD control section 211 and the right LCD 241 which function as a display element, and the right projection optical system 251. The right backlight control section 201 and the right backlight 221 function as a light source. The right LCD control section 211 and the right LCD 241 function as a display element.

The reception section 53 functions as a receiver for serial transmission between the control section 10 and the image display section 20. The right backlight control section 201 drives the right backlight 221 on the basis of a control signal which is input. The right backlight 221 is a light-emitting body such as an LED or an electroluminescence (EL). The right LCD control section 211 drives the right LCD 241 on the basis of a control signal which is transmitted from the image processing section 160 and the display control section 190. The right LCD 241 is a light transmissive liquid crystal panel in which a plurality of pixels are arranged in a matrix.

The right projection optical system 251 is constituted by a collimate lens that collimates image light emitted from the right LCD 241 into a parallel luminous flux. The right light guiding plate 261 as the right optical image display section 26 guides image light emitted from the right projection optical system 251 to a user's right eye RE while reflecting the image light along a predetermined light path. Meanwhile, the left display driving section 24 has the same configuration as the right display driving section 22 and corresponds to the user's left eye LE, and thus a description thereof will be omitted here.

Figure 9:
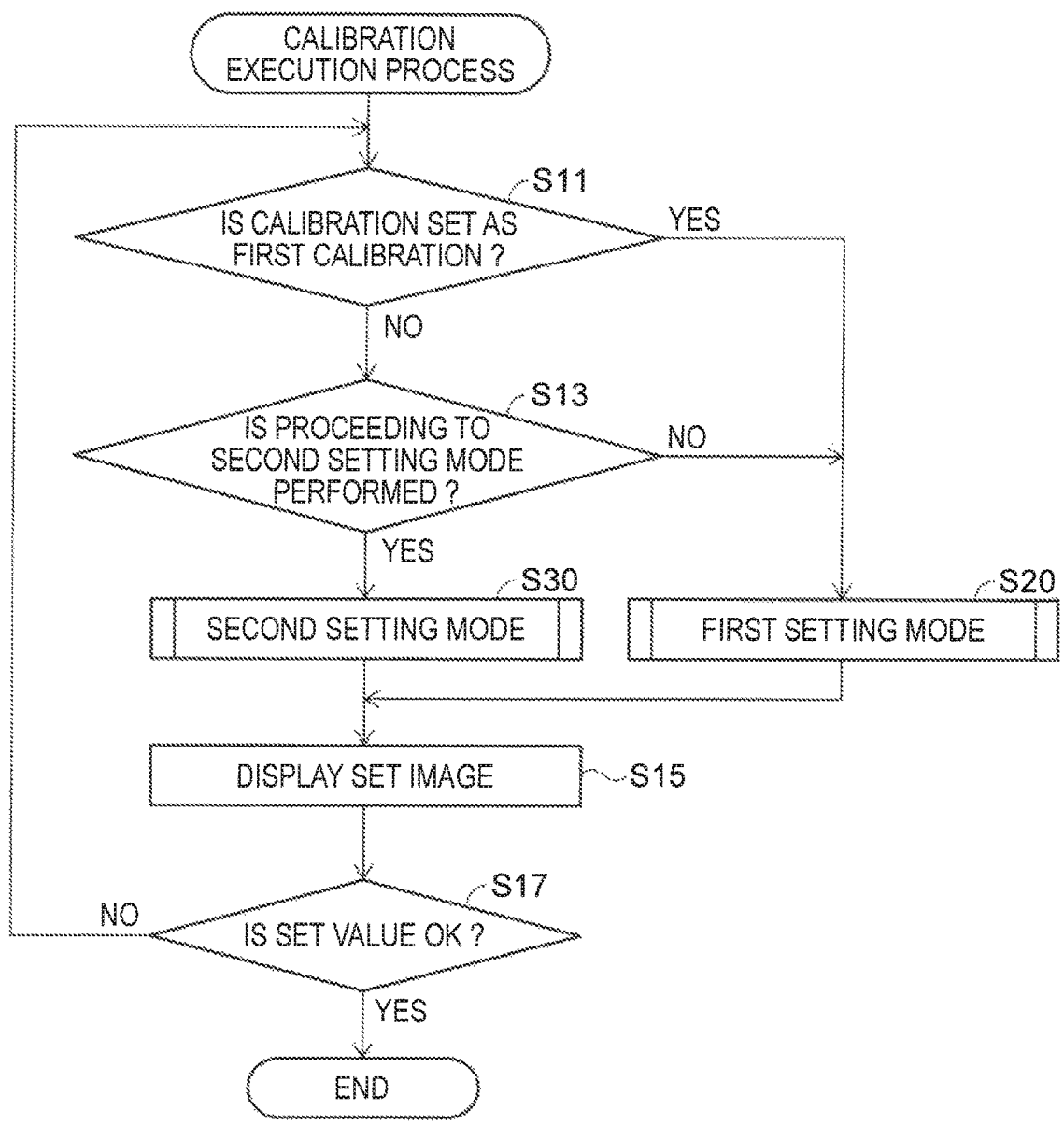
FIG. 9 is a flow chart of a calibration execution process according to the present embodiment.

A-2. Calibration Execution Process:

FIG. 9 is a flow chart of a calibration execution process according to the present embodiment. The calibration execution process according to the present embodiment includes two modes, that is, a first setting mode and a second setting mode. In the first setting mode, the HMD 100 causes a user US to perform calibration for each eye. In the second setting mode, the HMD 100 causes the user US to perform adjustment on his or her both eyes.

In the calibration execution process, when the operation input section 135 first receives a predetermined operation, the parameter setting section 167 determines whether or not calibration to be executed from now is set as first calibration (step S11). The marker image storage section 138 stores data regarding whether or not calibration to be executed is first calibration. In the present embodiment, it may be determined for each user US whether or not calibration is first calibration. Specifically, the camera 60 may image the shape and pattern of a palm of a user US, and the CPU 140 may specify the user US and may determine whether or not calibration is first executed by the user US. The specification of the user US may be performed by an ID card using near field communication. In a case where it is determined that calibration is set as first calibration (step S11: YES), the parameter setting section 167 proceeds to the first setting mode (step S20). Although the first setting mode will be described later in detail, the parameter setting section 167 displays a marker image IMG separately on the right optical image display section 26 or the left optical image display section 28 in the first setting mode. Thereafter, the parameter setting section 167 sets a transformation parameter and a camera parameter CP using images of real markers MK1 or MK2 which are imaged by the camera 60 in a state where the marker image IMG and the real markers MK1 and MK2 are visually perceived by the user US so as to be aligned with each other.

As the process of step S20, when the parameter setting section 167 has executed calibration in the first setting mode, the display image setting section 165 displays a setting image SIM associated with a specific object on the optical image display sections 26 and 28 using the set transformation parameter and camera parameter CP (step S15). In the present embodiment, the specific object is the real markers MK1 or MK2, but is not limited thereto. When the setting image SIM is displayed on the optical image display sections 26 and 28, the parameter setting section 167 determines whether or not the values of the transformation parameter and the camera parameter CP have been successfully adjusted in response to the operation received by the operation input section 135 (step S17). Specifically, the user US determines whether or not the visual recognition of the user US is performed so that the setting image SIM is associated with the position and orientation (pose) of the specific object, and the user US may operate the operation input section 135 according to the determination. In a case where the parameter setting section 167 receives an input indicating that the set transformation parameter and camera parameter CP are sufficient (step S17: YES), the parameter setting section terminates the calibration execution process.

In the process of step S17, in a case where the parameter setting section 167 receives an input indicating that the set transformation parameter and camera parameter CP are not sufficient by a predetermined operation being received by the operation input section 135 or receives an input indicating that it is necessary to further adjust size and depth perception (step S17: NO), the parameter setting section repeatedly performs the process of step S11 and the subsequent processes. In the process of step S11, the parameter setting section 167 determines that calibration to be executed from now is not set as first calibration (step S11: NO), the parameter setting section determines whether to proceed to the second setting mode by a predetermined operation being received by the operation input section 135 (step S13). In a case where the parameter setting section 167 determines not to proceed to the second setting mode (step S13: NO) based on an instruction from the user US, the parameter setting section proceeds to the above-described first setting mode (step S20).

In the process of step S13, in a case where the parameter setting section 167 determines to proceed to the second setting mode (step S13: YES), the parameter setting section proceeds to the second setting mode (step S30). The second setting mode will be described later in detail. However, in the second setting mode, the display image setting section 165 transforms the position and pose of the specific object with respect to the camera 60, which are obtained by imaging the specific object by the camera 60, into the positions and orientations (poses) of the specific object with respect to the right and left optical image display section 26 using the parameter groups which are set in the first setting mode or the second setting mode which has been executed already. The display image setting section 165 displays the setting image SIM on the right optical image display section 26 and the left optical image display section 28 with the positions and poses obtained by the conversion. Thereafter, the parameter setting section 167 further adjusts some of the parameter groups so as to change the setting image SIM associated with the specific object in response to the predetermined operation being received by the operation input section 135. When the parameter setting section 167 executes calibration in the second setting mode, the display image setting section 165 executes the process of step S15, and the subsequent processes are repeated.

A-2-1. First Setting Mode:

A process in a first setting mode is as follows. The HMD 100 causes a user US to perform two alignments each of which is performed at a time with respect to one eye, using two real markers MK1 and MK2 having different sizes, to thereby cause the user to perform a total of four alignments. Specifically, first, the HMD 100 displays a marker image IMG on the right optical image display section 26 or the left optical image display section 28. The marker image IMG is obtained by projection, that is, rendering a model marker having an imaginary position and pose (3D) to display regions (2D) of the optical image display sections 26 and 28 with respect to each of the right optical image display section 26 and the left optical image display section 28. The imaginary position and pose are fixed with respect to the optical image display sections 26 and 28 in the present embodiment, but may be variable. The user US moves to a position and orientation (pose) at which the marker image IMG displayed on the right optical image display section 26 or the left optical image display section 28 and the real marker MK1 or the real marker MK2 can be visually perceived so as to be superimposed on or aligned with each other. In a case where the marker IMG and the real marker MK1 or MK2 are visually perceived by the user US so as to be superimposed on or aligned with each other, the real marker MK1 or MK2 is positioned at a predetermined distance according to the sizes of the real markers MK1 and MK2 and take the above-mentioned imaginary pose, with respect to the right optical image display section 26 or the left optical image display section 28. In a state where the marker image IMG and the real marker MK1 or the real marker MK2 are aligned with each other, the parameter setting section 167 images the real marker MK1 or the real marker MK2 using the camera 60. The parameter setting section 167 sets a transformation parameter and a camera parameter CP using the real marker MK1 or the real marker MK2 included in the captured image.

Figure 10:
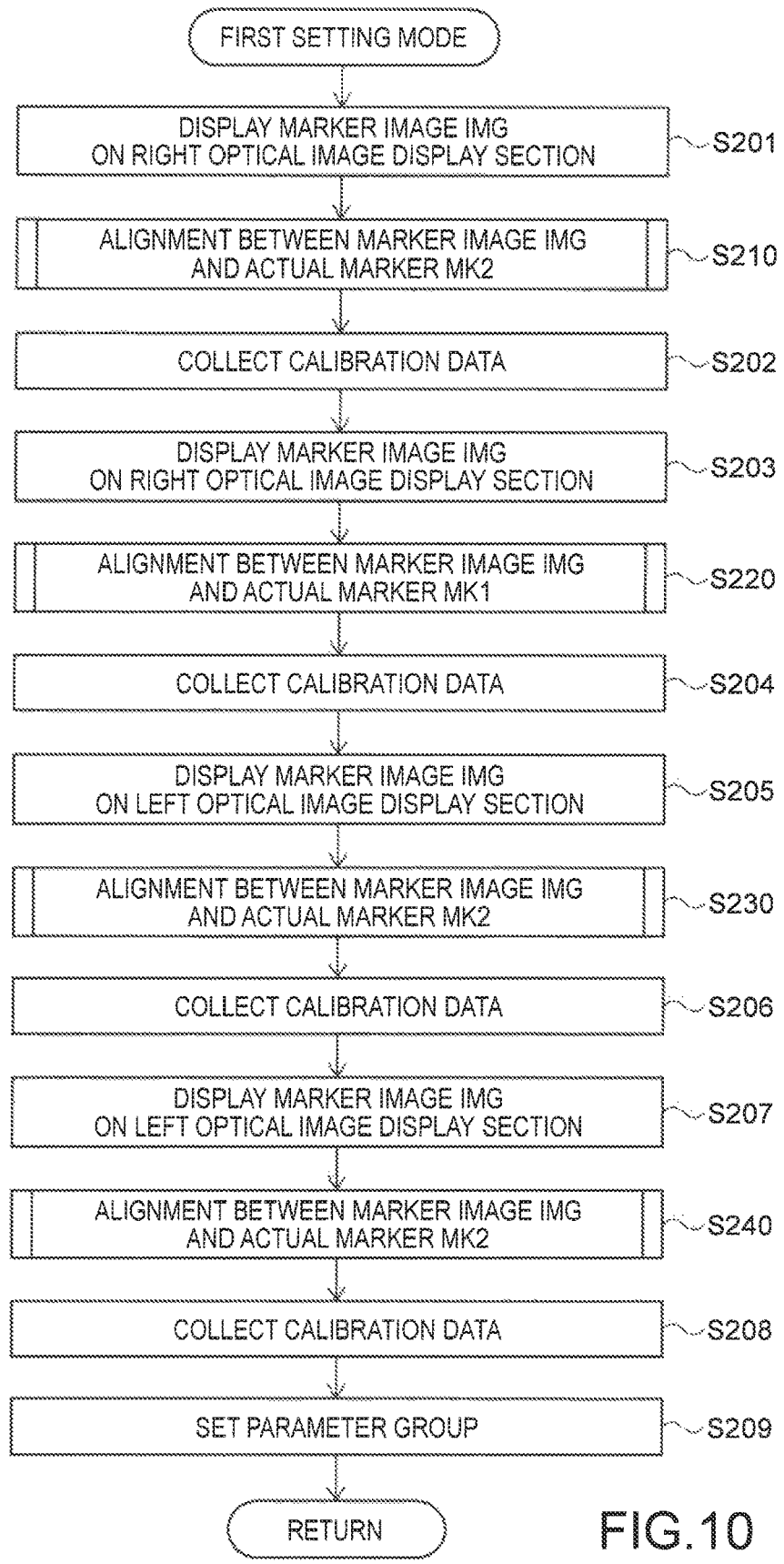
FIG. 10 is a flow chart of a first setting mode.

FIG. 10 is a flow chart of a first setting mode. In the first setting mode, the parameter setting section 167 collects calibration data in a state where alignment regarding the right optical image display section 26 is established, collects calibration data in a state where alignment regarding the left optical image display section 28 is established, and sets a transformation parameter and a camera parameter CP.

Figure 11:
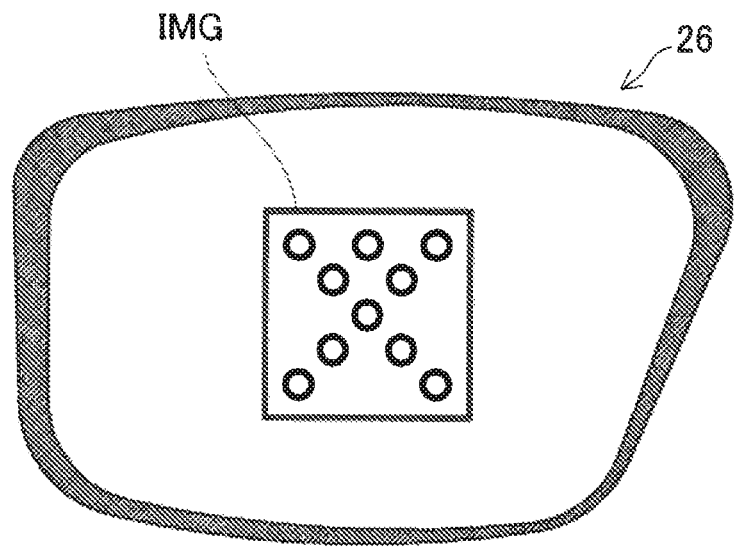
FIG. 11 is a diagram illustrating a marker image displayed on an optical image display section.

In the first setting mode, first, the display image setting section 165 displays a marker image IMG on the right optical image display section 26 (step S201). FIG. 11 is a diagram illustrating a marker image IMG displayed on the optical image display section 26. As illustrated in FIG. 11, the display image setting section 165 displays an outer frame of a square of a marker and outer frames of ten circles included in the square on the right optical image display section 26. The display image setting section 165 displays the marker image IMG on the right optical image display section 26 as a red line. Meanwhile, in FIG. 11, portions other than the right optical image display section 26 within the image display section 20 are not illustrated and will not be illustrated in the subsequent drawings.

When the marker image IMG is displayed on the right optical image display section 26, the parameter setting section 167 prompts a user US to match the positions and poses of the marker image IMG and a real marker MK2 with the HMD 100 worn on the user US so that the marker image and the real marker are visually perceived so as to be aligned with each other (step S210 of FIG. 10).

An message may further be displayed on the right optical image display section 26. In a case where the marker image IMG and the real marker MK2 are visually perceived by the user US so as to be aligned with each other, the HMD 100 instruct the user US to operate a touch pad, to press a button, or to utter a sound command. In a case where the parameter setting section 167 receives these operations or the sound command, the camera 60 images the marker MK2, that is, collects calibration data (step S202). In a case where the parameter setting section 167 collects calibration data on the basis of the sound command, it is expected that the head of the user US will scarcely move. For this reason, in an operation based on the sound command, it is possible to collect calibration data in a state where there is a little deviation from alignment established by the user US, as compared to a case of a touch operation or the pressing of a button. As a result, the HMD 100 having a high level of superposition accuracy of an AR image is obtained.

When the process of matching the positions and poses of the marker image IMG and the real marker MK2 (alignment process by visual observation) of step S210 of FIG. 10 and the collection of calibration data are performed, the display image setting section 165 displays the marker image IMG on the right optical image display section 26 as illustrated in FIG. 11, similar to the process of step S201 (step S203). Thereafter, the parameter setting section 167 prompts the user US to match the positions and poses of the marker image IMG and a real marker MK1 with the HMD 100 worn on the user so that the marker image IMG and the real marker MK1 are visually perceived so as to be aligned with each other (step S220). The real marker MK1 is imaged in this state, and thus the parameter setting section 167 collects calibration data (step S204). Here, the real marker MK1 is larger than the real marker MK2. For this reason, in the process of step S220, in a case where the marker image IMG and the real marker MK1 are visually perceived by the user US so as to be aligned with each other, a distance between the right optical image display section 26 and the real marker MK1 becomes larger than that in a case of the real marker MK2.

The parameter setting section 167 performs processes of step S205 to step S208 of FIG. 10 with respect to the left optical image display section 28, as the same processes as the processes of step S201 to step S204 in the right optical image display section 26. When processes (processes of step S201 to step S208) in the first setting mode are performed with respect to the right and left optical image display sections 26 and 28, the parameter setting section 167 can set a parameter group with respect to the right optical image display section 26 and a parameter group with respect to the left optical image display section 28 for minimizing Expression (15) to be described later (step S209).

A-2-2. Setting of Parameters:

Here, a description will be given of a procedure of setting parameters of a transformation parameter and a camera parameter CP by the parameter setting section 167 using imaging data of the real marker MK2 and imaging data of the real marker MK1 which are obtained by the camera 60 in a first setting mode. Meanwhile, in the first setting mode of the present embodiment, the camera parameter CP is not necessarily have to be optimized, and may be fixed to a design value. However, in the present embodiment to be described below, an algorithm including a camera parameter CP as an optimization variable(s) is present so that a user US can optimize the camera parameter CP as necessary. In another embodiment, in a case where it is not necessary to optimize the camera parameter CP, the following expressions may be dealt with using these parameters as constants (fixed values).

A-2-2-1. With Regard to Camera Parameter:

As a camera parameter CP regarding the camera 60, four camera parameters CP (fx, fy, Cx, Cy) are used in the present embodiment. The camera parameters (fx, fy) are focal lengths of the camera 60 which is an imaging section, and are converted into the number of pixels on the basis of the density of pixels. The camera parameters (Cx, Cy) are called the camera principal point position, means the center position of a captured image, and may be expressed by, for example, a 2D coordinate system which is fixed to an image sensor of the camera 60.

The camera parameter CP can be known from the product specifications of the camera 60 constituting a principle portion of the imaging section (hereinafter, also referred to as a default camera parameter). However, in many cases, a camera parameter CP of a real camera greatly departs from a default camera parameter. In addition, when cameras are different products in spite of having the same specifications, camera parameters CP of cameras for each product vary (are not even).

In a case where at least one of a position, size, and pose in an AR model displayed on the optical image display sections 26 and 28 as an AR image is visually perceived by a user so as to be aligned with (superposed on) a real object, the camera 60 functions as a detection device that detects the position and pose of the real object. At this time, the parameter setting section 167 estimates the position and pose of the real object imaged by the camera 60 with respect to the camera 60 using the camera parameter CP. Further, the parameter setting section 167 transforms the position and pose of a real object with respect to the left optical image display section 28 using a relative positional relationship between the camera 60 and the left optical image display section 28 (right optical image display section 26). Further, the parameter setting section 167 determines the position and pose of the AR model on the basis of the transformed position and pose. In addition, the image processing section 160 projects (transforms) the AR model having the position and the pose to a display region using a projection parameter, and writes the projected AR model in a display buffer (for example, the RAM 122). In addition, the display control section 190 displays the AR model written in the display buffer on the left optical image display section 28. For this reason, in a case where the camera parameter CP is a default camera parameter, the estimated position and pose of the real object may include errors. In this case, the displayed AR model and the real object, which are to be superposed on or overlaid with each other, are visually perceived by a user as if there is an error in superposing the AR model on the real object due to the errors of the estimated position and pose.

Consequently, in the present embodiment, the parameter setting section 167 optimizes and sets a camera parameter CP using pieces of imaging data of the real marker MK2 or the real marker MK1 during calibration for allowing an AR model to be superposed on an object and to be visually perceived by a user US. In addition, the position and pose of the real object are detected (estimated) using the set camera parameter CP. In this manner, the degree to which a deviation generated between the displayed AR model and a real object is visually perceived by a user US becomes lower in displaying the AR model. As described later, even when the same user US uses the same HMD 100, it is preferable that a camera parameter CP is set whenever calibration is performed and is used for a subsequent display in which at least one of the position, size, and orientation of an object is aligned with that of an AR model. This does not indicate that a user necessarily matches the positions and poses of a real marker MK2 or a real marker MK1 and a marker image IMG corresponding to the real marker MK2 or the real marker MK1 with the same level of accuracy during calibration. Even when a user US matches positions and poses with different levels of accuracy, a camera parameter CP is set accordingly, thereby suppressing an increase in a deviation of a superposition display in a case where an AR model and a real object are displayed so as to be superposed on each other.

A-2-2-2. With Regard to Transformation Parameter:

In addition, the HMD 100 of the present embodiment has a structure in which a relative positional relationship between the camera 60 and the optical image display sections 26 and 28 changes. As understood from a description of a default camera parameter, in a case where causing at least one of the position, size, and pose of an AR model to be visually perceived by a user so as to be aligned with (superposed on) a real object, the display of the AR model based on a relative positional relationship different from a real relative positional relationship between the camera 60 and the optical image display sections 26 and 28 makes an error visually perceived in the displayed AR model and a real object that are superposed on each other.

Consequently, in the present embodiment, a transformation parameter indicating a relative positional relationship (at least one of rotation and translation) between a coordinate system of the camera 60, a coordinate system of the right optical image display section 26, and a coordinate system of the left optical image display section 28 is adjusted or set, during calibration for making an AR model visually perceived by a user so as to be superposed on an object. When the AR model is displayed using a spatial relationship (relative positional relationship) indicated by the set transformation parameter, the degree to which a deviation is visually perceived by a user US becomes lower.

In the present embodiment, the parameter setting section 167 sets a left transformation parameter PML[$R_{cam2left}$, $t_{cam2left}$] and a right transformation parameter PMR [$R_{cam2right}$ $t_{cam2right}$] that correspond to the right optical image display section 26 and the left optical image display 28, respectively. A rotation matrix $R_{cam2right}$ is three parameters that are determined by the rotation of three axes perpendicular to each other, and a translation matrix $t_{cam2right}$ is three parameters that respectively correspond to translations along the three axes. That is, the right transformation parameter PMR corresponding to the right optical image display section 26 includes a total of six parameters. Similarly, the transformation parameter corresponding to the left optical image display section 28 is a rotation matrix $R_{cam2left}$ and a translation matrix $t_{cam2left}$, and includes a total of six parameters. As described above, in the present embodiment, 16 parameters of four parameters included in a camera parameter CP and 12 transformation parameters indicating a spatial relationship are calculated.

A-2-2-3. Parameter Derivation Process:

In the following description, the camera 60 images a real marker MK2 (or a real marker MK1) in a state where the real marker MK2 (or the real marker MK1) and a marker image IMG are visually perceived by a user US so as to be aligned with each other, and the parameter setting section 167 acquires the captured image. The parameter setting section 167 calculates a camera parameter and a transformation parameter using Expression (15) to be described later, on the basis of the acquired captured image. In the present embodiment, a measurement value(s) or an inspection value(s) before the shipment of the HMD 100 from a manufacturing factory is used as an initial value (s) (i=0) in a case where a parameter group is derived. On the other hand, in another embodiment, a value(s) in the pose of either the camera 60 or the optical image display sections 26 and 28 in a case where the movement thereof is maximized, or a value(s) in the middle pose in the movable range may be used as an initial value(s).

Figure 12:
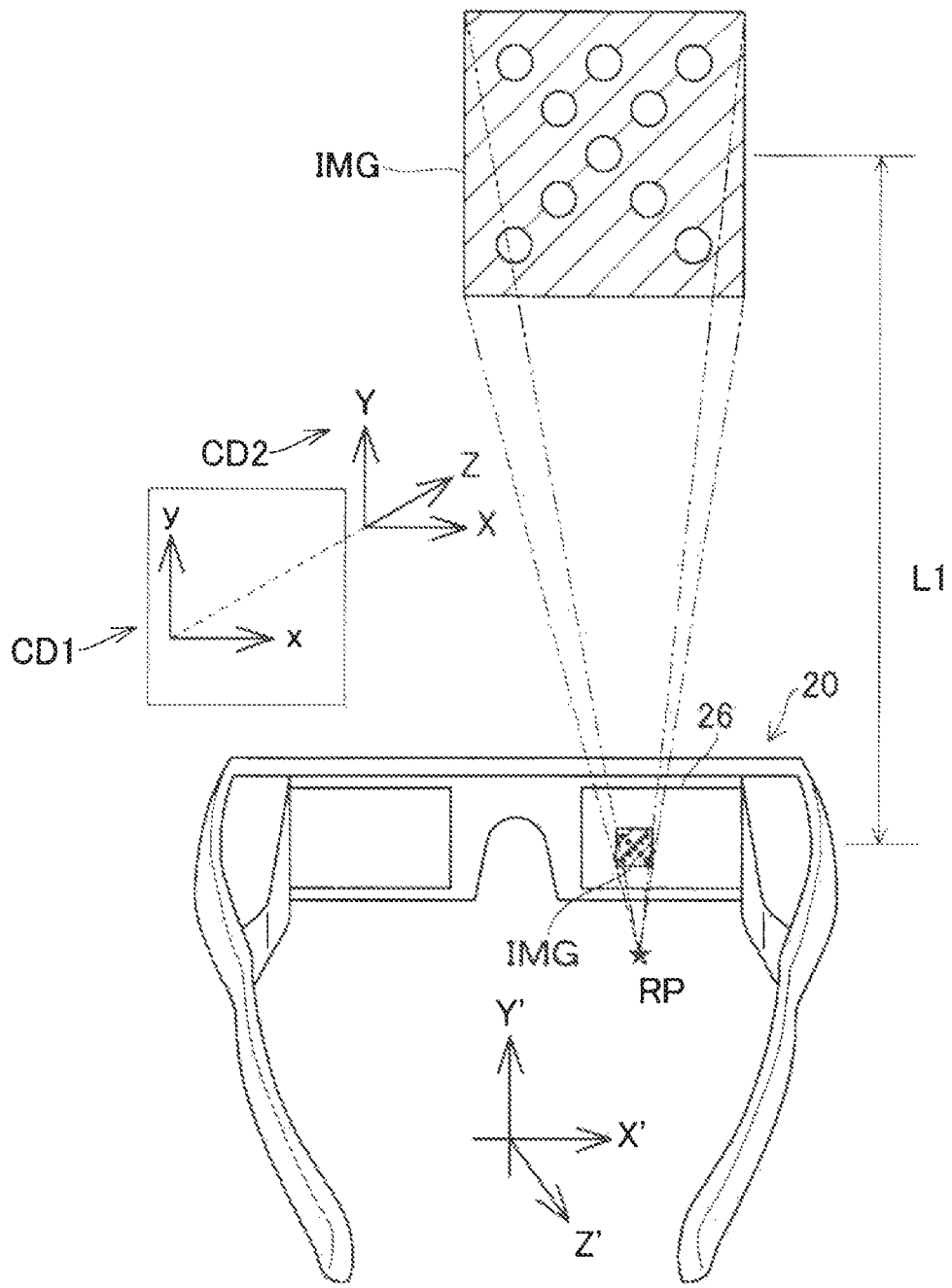
FIG. 12 is a schematic diagram illustrating a spatial positional relationship in a state where a marker image is displayed on only a right optical image display section.

FIG. 12 is a schematic diagram illustrating a spatial positional relationship in a state where a marker image IMG is displayed on only the right optical image display section 26. FIG. 12 schematically illustrates a case where a user US visually perceives a marker image IMG displayed on the right optical image display section 26 from a right eye position RP which is set in advance as the position of an imaginary right eye of the user US wearing the image display section 20. Meanwhile, in FIG. 12, only the image display section 20 within the HMD 100 is illustrated, and the mounting band 90, the control section 10, and the like are not illustrated. In other words, the image display section 20 illustrated in FIG. 12 is the same image display section as the image display section 20 illustrated in FIGS. 1 to 3. In addition, FIG. 12 illustrates a coordinate axis CD2 indicating a coordinate axis of an outside scene which is a three-dimensional space to be imaged, and a coordinate axis CD1 indicating a coordinate axis of a two-dimensional image in which the coordinate axis CD2 is projected. The user US visually perceives the marker image IMG displayed on the right optical image display section 26 as a marker MK1 which is present at a position separated from the image display section 20 at a distance L1.

As illustrated in FIG. 12, in a case where a user visually perceives the marker image IMG displayed on the right optical image display section 26 and a real marker MK1 which is included in an outside scene and is positioned at the front so that the positions, sizes, and orientations of the marker image and the real marker are aligned with each other (hereinafter, also referred to as a case where a user US establishes alignment by his or her left eye LE (right eye RE)), the following relationship of Expression (1) is established between coordinate systems. Meanwhile, hereinafter, a description will be given of a case where a marker image IMG is displayed on the left optical image display section 28 instead of being displayed on the right optical image display section 26.

$$CP \times [R_{o2dl}, t_{o2dl}] \times \text{ModelMatrix} = CP \times [R_{cam2left}, t_{cam2left}] \times [R_{obj2cam}, t_{obj2cam}] \times \text{ModelMatrix} \quad (1)$$

Here, CP on each of the right and left sides indicates a camera parameter CP of the camera 60. In addition, [Ro2dl, to2dl] indicates a transformation matrix from a coordinate system fixed to a real object (in this case, a real marker MK2 or a real marker MK1) to a coordinate system fixed to the left optical image display section 28. Among these, [$R_{o2dl}$] indicates a 3×3 matrix indicating rotations, and [$t_{o2dl}$] indicates a 3×1 matrix indicating translations. Here, [$R_{o2dl}$, $t_{o2dl}$] indicates the position and pose of the real object with respect to the left optical image display section 28. In addition, ModelMatrix indicates a 3×1 matrix indicating any one point on a model marker. The model marker is three-dimensional data (three-dimensional model: but is a plan in the present embodiment) which is a basis in a case where a marker image IMG is displayed on the optical image display section 28. The notation of [$R_{o2dl}$, $t_{o2dl}$]×ModelMatrix goes by a rule of the following Expression (2).

$$[R_{o2dl}, t_{o2dr}] \times \text{ModelMatrix} = [R_{o2dl}] \times \text{ModelMatrix} + [t_{o2dl}] \quad (2)$$

The rule of the notation of Expression (2) mentioned above is also applied to other portions of Expression (1).

Here, [$R_{cam2left}$, $t_{cam2left}$] on the right side of Expression (1) indicates a transformation matrix from the coordinate system of the camera 60 to the coordinate system of the left optical image display section 28. The transformation matrix is constituted by a plurality of transformation parameters that are set by the parameter setting section 167. In addition, [$R_{obj2cam}$, $t_{obj2cam}$] on the right side of Expression (1) indicates a transformation matrix from a coordinate system of a real object (a real marker MK2 or a real marker MK1) to the coordinate system of the camera 60. In addition, [$R_{obj2cam}$, $t_{obj2cam}$] indicates the position and pose of the real object with respect to the camera 60.

From the relationship of Expression (1), when alignment between a marker image IMG and the real marker MK2 or the real marker MK1 is established with respect to the left optical image display section 28, the following Expressions (3) and (4) are established.

$$R_{obj2cam} = \text{inv}(R_{cam2left}) * R_{o2d_l} \tag{3}$$

$$t_{objzcam} = \text{inV}(R_{cam2left}) * (t_{o2d_l} - t_{cam2left}) \tag{4}$$

In a case where the pose of the real marker MK2 or the real marker MK1 with respect to the camera 60 is applied to a model marker when it is assumed that the alignment of the left eye LE is established, any point on the model marker transformed into the coordinate system of the camera 60 is expressed as $P_{cl}$ ($X_{cl}$, $Y_{cl}$, $Z_{cl}$) by the following Expression (5).

$$P_{cl} = \begin{bmatrix} X_{cl} \\ Y_{cl} \\ Z_{cl} \end{bmatrix} \tag{5}$$

$$= R_{obj2cam} \times ModelMatrix + t_{obj2cam}$$

Here, when $R_{obj2cam}$ and $t_{obj2cam}$ are erased by Expression (3) and Expression (4), Expression (5) changes to the following Expression (6).

$$P_{cl} = \begin{bmatrix} X_{cl} \\ Y_{cl} \\ Z_{cl} \end{bmatrix} \tag{6}$$

$$= \text{inv}(R_{cam2left})(R_{o2d_l} \times ModelMatrix + t_{o2d_l} - t_{cam2left})$$

Here, $R_{o2dl}$ and $t_{o2dl}$ respectively indicate rotation and translation from the coordinate system of the real marker MK2 or the real marker MK1 to the coordinate system of the left optical image display section 28. In the present embodiment, when the user US aligns the marker image IMG displayed on the left optical image display section 28 with the real marker MK2 or the real marker MK1, the marker image IMG is fixed and displayed at a predetermined position (for example, the center) on the left optical image display section 28 with a predetermined orientation and a predetermined size. Such that $R_{o2dl}$ and $t_{o2dl}$ become predetermined rotation and translation which coincide with the predetermined position, orientation and size of the marker image IMG. Here, $T_{cam2left}$ indicates translation from the coordinate system of the camera to the coordinate system of the left optical image display section 28.

$$R_{o2d_l} = \begin{bmatrix} 1 & 0 & 0 \\ 0 & 1 & 0 \\ 0 & 0 & 1 \end{bmatrix} \tag{7}$$

$$t_{o2d_l} = \begin{bmatrix} 0 \\ 0 \\ -a \end{bmatrix} \tag{8}$$

$$t_{cam2left} = \begin{bmatrix} D1 \\ D2 \\ D3 \end{bmatrix} \tag{9}$$

Elements in Expressions (7) and (8) mentioned above are constants (a is L1 of FIG. 12) in the present embodiment. Elements D1, D2, and D3 in Expression (9) indicate initial values in the present embodiment, and may vary during a parameter derivation process. Meanwhile, as understood from FIG. 12, in the present embodiment, in a coordinate system fixed to the image display section 20, a direction of light emitted to the eyes of a user US from the optical image display sections 26 and 28 (image display section 20) is parallel to a Z-axis direction.

When a model marker expressed as Expression (5) is projected onto an image captured with the camera 60, coordinates of the model marker on the captured image are as follows.

$$x_{iml} = F_x \frac{X_{cl}}{Z_{cl}} + C_x \tag{10}$$

$$y_{iml} = F_y \frac{Y_{cl}}{Z_{cl}} + C_y \tag{11}$$

Here, (Fx, Fy) indicates focal lengths of the camera 60, and (Cx, Cy) indicates principal point position coordinates of the camera 60.

When coordinates of a feature element of a marker in a captured image obtained by actually imaging the real marker MK2 or the real marker MK1 by the camera 60 are represented as ($u_l$, $v_l$), a difference between ($u_l$, $v_l$) and ($x_{iml}$, $y_{iml}$) is as follows.

$$e_i = \begin{bmatrix} e_x \\ e_y \end{bmatrix} = \begin{bmatrix} u_{li} - x_{imli} \\ v_{li} - y_{imli} \end{bmatrix}, i = 1 \sim 9 \tag{12}$$

A subscript i in Expression (12) is an integer indicating a feature element in a marker and has a value of 1 to 9. The parameter setting section 167 derives the sum of squares expressed as Expression (13) with respect to the alignment of the left eye LE.

$$E_L = \sum_{i=1}^{9} ((u_{li} - x_{imli})^2 + (v_{li} - y_{imli})^2) \tag{13}$$

Also in a case where the user establishes alignment between a marker displayed on the right optical image display section 26 and the real marker MK2 or the real marker MK1 using the right eye RE, the sum of squares expressed as Expression (14) is derived similarly.

$$E_R = \sum_{i=1}^{9} ((u_{ri} - x_{imri})^2 + (v_{li} - y_{imri})^2) \quad (14)$$

A cost function E expressed as Expression (15) is defined by the sum of $E_R$ and $E_L$.

$$E = E_R + E_L \quad (15)$$

A parameter for minimizing (global minimum) E is obtained by optimization calculation accompanied by iterative calculation such as a Gaussian Newton's method.

In the present embodiment, the camera parameter CP of the camera 60, a transformation parameter indicating rotation ($R_{cam2left}$) and translation ($T_{cam2left}$) from the coordinate system of the camera 60 to the coordinate system of the left optical image display section 28, and a transformation parameter indicating rotation ($R_{cam2right}$) and translation ($T_{cam2right}$) from the coordinate system of the camera 60 to the coordinate system of the right optical image display section 26 are set by optimization.

A Jacobian matrix which is used for iterative calculation for minimizing the cost function E expressed as Expression (15) is expressed as Expression (16).

$$J_L = \begin{bmatrix} \dfrac{\partial x_{im_{li}}}{\partial p} \\ \dfrac{\partial y_{im_{li}}}{\partial p} \end{bmatrix} \quad (16)$$

Here, variables $x_{mli}$ and $y_{mli}$ on the right side of Expression (16) are expressed by Expressions (10) and (11), respectively, and $x_{cl}$ and $y_{cl}$ in Expressions (10) and (11) are expressed by Expression (6). In addition, a variable p on the right side of Expression (16) is Fx, Fy, Cx, and Cy that are included in the camera parameters CP of the camera 60, six Euler's angles constituting rotation $R_{cam2left}$ and $R_{cam2right}$ indicating a spatial relationship between the camera 60 and the optical image display sections 26 and 28, and six translation components constituting translation $T_{cam2left}$ and $T_{cam2right}$. The parameter setting section 167 can search for the global minimum of Expression (15) on the basis of the Jacobian matrix of Expression (16) and a minute variation of a variable p. A camera parameter CP and a transformation parameter are obtained by a variable p corresponding to the global minimum.

When the camera parameter CP and the transformation parameter are set, the display image setting section 165 displays a setting image SIM on the optical image display sections 26 and 28 for the purpose of causing a user US to confirm the set transformation parameter and camera parameter CP using an image, as the process of step S15 in the calibration execution process illustrated in FIG. 9. In a case where a specific object (a real marker MK1 in this example) is included in an imaging range of the camera 60, the CPU 140 derives the position and pose of the specific object with respect to the camera 60 using the set camera parameter CP. In addition, the CPU 140 transforms the position and pose of the specific object with respect to the camera 60 into the position and pose of the specific object with respect to the optical image display sections 26 and 28, using the set transformation parameter. The display image setting section 165 gives the transformed position and pose to an AR model, projects the AR model, and displays the AR model on the optical image display sections 26 and 28 as a setting image SIM. In this example, when a user US can be allowed to visually perceive the position and pose of the setting image SIM to be aligned with the position and pose of the specific object and to track the movement of the specific object, the setting of the transformation parameter and the camera parameter CP is sufficient. When internal coordinates of a real marker or an AR model corresponding to the real marker is defined as X, a position (u, v) on a display image in the left optical image display section 28 is expressed as Expression (17) with a transformation parameter.

$$\begin{bmatrix} u \\ v \end{bmatrix} \simeq RP[R_{cam2left}, T_{cam2left}][R_{obj2cam}, T_{obj2cam}] \cdot X \quad (17)$$

Here, [$R_{obj2cam}$, $T_{obj2am}$] indicates parameters (a rotation matrix and a translation matrix) which indicate a spatial relationship between a real marker MK2 or a real marker MK1 and the camera 60, and are calculated by the parameter setting section 167 by applying, for example, a homography to a captured image of the real marker MK2 or the real marker MK1 which is imaged by the camera 60. In a case where the marker specification section 166 is to detect a specific object other than the real marker MK2 and the real marker MK1, the parameter setting section 167 sets a spatial relationship between the specific object and the camera 60 using another method. Meanwhile, also regarding the right optical image display section 26, a position (u, v) of a display image is derived by the relational expression similar to Expression (17). As expressed as Expression (17), the display image setting section 165 displays an AR model as an AR image at positions (u, v) which are determined on the basis of at least a spatial relationship between the real marker MK2 or the real marker MK1 and the camera 60 and a spatial relationship between the camera 60, and the right/left optical image display sections 26/28. The display image setting section 165 can make a user US visually perceive the AR model (setting image SIM in this case) and a specific object so that at least one of the position, size, and orientation of the AR model is aligned with at least one of the position, size, and orientation of the specific object. Meanwhile, RP on the right side in Expression (17) indicates a projection parameter (or also referred to as a rendering parameter) which is determined in a case where a projection model similar to a pinhole camera model is used, and is expressed as the following Expression (18) in the present embodiment.

$$RP = \begin{bmatrix} \dfrac{2}{W}F_x & 0 & 1 - \dfrac{2C_x}{W} & 0 \\ 0 & \dfrac{2}{H}F_y & 1 - \dfrac{2C_y}{H} & 0 \\ 0 & 0 & -\dfrac{(n+f)}{f-n} & \dfrac{-2nf}{f-n} \\ 0 & 0 & -1 & 0 \end{bmatrix} \quad (18)$$

Here, Fx and Fy in Expression (18) indicate focal lengths converted into the number of pixels of a projector in the HMD 100, W indicates the number of pixels (resolution) of the left optical image display section 28 in a left-right direction, H indicates the number of pixels (resolution) of the left optical image display section 28 in an up-down direction, and Cx and Cy indicate the center position of a display image. Two upper rows of the projection parameter contributes to the derivation of u and v. Here, f and n are coefficients for determining a correlation with normalized device coordinates having a normalized depth between 0 and 1. That is, these coefficients are coefficients for adjusting a depth in a rendering buffer (depth buffer), but does not directly contribute to the derivation of a position (u, v) of a display image.

Here, when it is assumed that an image of the specific object or the AR model X is imaged by the camera 60, Expression (19) is established between a point of the specific object or the AR model X and a corresponding point on the captured image.

$$\text{image}\begin{pmatrix} x \\ y \end{pmatrix} = \begin{pmatrix} f_x & 0 & C_x \\ 0 & f_y & C_y \\ 0 & 0 & 1 \end{pmatrix}(R, T) \cdot X \quad (19)$$

Here, (R, T) on the right side of Expression (19) indicates a transformation matrix indicating the position and pose of a specific object with respect to the camera 60, and is expressed by a camera coordinate system. The left side of the transformation matrix is a camera parameter CP. As schematically illustrated in Expression (19), (R, T) is estimated on the basis of a correlation between a point in a real space or a three-dimensional coordinate system and a point on a captured image, and thus it is preferable that the camera parameter CP is appropriate for the accurate estimation of the position and pose of a real object.

Since the same coordinate point of an AR model in three-dimension is rendered to a display buffer in the image processing section 160, the normalized device coordinates (NDC) thereof are expressed as Expression (20) using Expression (18).

$$\begin{pmatrix} u \\ v \\ w \\ z \end{pmatrix} = \begin{bmatrix} \frac{2}{W}F_x & 0 & 1 - \frac{2C_x}{W} & 0 \\ 0 & \frac{2}{H}F_y & 1 - \frac{2C_y}{H} & 0 \\ 0 & 0 & -\frac{(n+f)}{f-n} & \frac{-2nf}{f-n} \\ 0 & 0 & -1 & 0 \end{bmatrix} \quad (20)$$

$$(I, d)\begin{bmatrix} 1 & 0 & 0 & 0 \\ 0 & -1 & 0 & 0 \\ 0 & 0 & -1 & 0 \\ 0 & 0 & 0 & 1 \end{bmatrix}(R, T) \cdot X$$

Expression (20) is expressed by homogeneous coordinate expression. Here, X on the right side of Expression (20) indicates internal coordinates of a model marker or an AR model, and is expressed by a coordinate system which is fixed to a model. In addition, (R, T) on the left side of X in Expression (20) indicates the position and pose of a specific object which is expressed by a camera coordinate system, and indicates the same position and pose as (R, T) in Expression (19). A 4×4 matrix having 0, 1, and −1 as elements on the left side of (R, T) in Expression (19) is a transformation matrix for transforming the orientation of a coordinate axis, and is provided for the sake of convenience in the present embodiment because the definition of a coordinate axis in a forward direction in a camera coordinate system is different from that in a display section coordinate system. In addition, (I, d) on the left side of the transformation matrix for transforming the orientation of a coordinate axis in Expression (19) indicates a spatial relationship between the camera 60 and the optical image display section 26 (28), and indicates a 4×4 transformation matrix constituted by rotation I and translation d that are expressed by a coordinate system of the optical image display section 26 (28). A coordinate point expressed by Expression (20) is a position expressed by (u', v') of Expression (21) in an image plane of the optical image display section 26 (28).

$$\begin{pmatrix} u' \\ v' \end{pmatrix} = \begin{bmatrix} -\frac{2}{W}F_x \cdot \frac{R_1 \cdot X + d_x + T_x}{-R_3 \cdot X + d_z - T_z} - \left(1 - \frac{2C_x}{W}\right) \\ -\frac{2}{W}F_y \cdot \frac{R_2 \cdot X + d_y + T_y}{-R_3 \cdot X + d_z - T_z} - \left(1 - \frac{2C_y}{W}\right) \end{bmatrix} \simeq \quad (21)$$

$$\begin{bmatrix} \frac{2}{W}\left(C_x + F_x\frac{T_x}{T_z}\right) - 1 \\ \frac{2}{H}\left(C_y + F_y\frac{-T_y}{T_z}\right) - 1 \end{bmatrix}$$

In the present embodiment, when calibration is successfully performed, a user US wearing the HMD 100 visually perceives a setting image SIM displayed on the optical image display sections 26 and 28 and a specific object (real marker MK1 in this example) so that the position, size, orientation, and depth perception of the setting image SIM are aligned with the position, size, orientation, and depth perception of the specific object.

Figure 13:
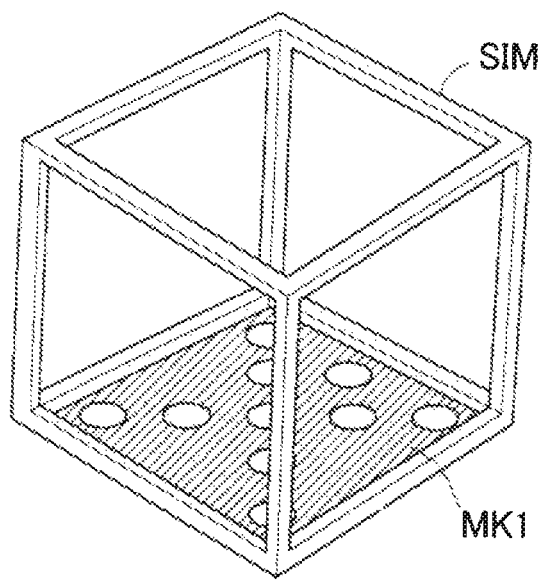
FIG. 13 is a diagram illustrating an example of a field of view of a user who visually perceives a setting image displayed in association with a specific object.

FIG. 13 is a diagram illustrating an example of a field of view of a user US who visually perceives a setting image SIM displayed in association with a specific object. In the example illustrated in FIG. 13, a real marker MK1 is adopted as the specific object. After calibration is executed, the display image setting section 165 displays the setting image SIM on the right and left optical image display sections 26 and 28 in accordance with the position and orientation (pose) of the imaged real marker MK1, using a transformation parameter and a camera parameter CP which are set by the parameter setting section 167. The setting image SIM is an image constituting sides of a regular hexahedron. As illustrated in FIG. 13, the bottom of the regular hexahedron of the setting image SIM is displayed so as to be matched the real marker MK1. The user US can recognize the accuracy of calibration by visually recognizing a spatial relationship between the real marker MK1 as a specific object and the setting image SIM. When the user US does not visually perceive the real marker MK1 and the setting image SIM so that the real marker and the setting image match each other, the user can execute calibration again in a first setting mode or a second setting mode. As illustrated in FIG. 13, the optical image display sections 26 and 28 or the sound processing section 170 may present a character image or a sound for promoting either the continuation of an AR display function by the success of calibration (or viewed in an overlapping manner) or the re-execution of calibration, to the user.

A-2-2-4. Automatic Collection of Calibration Data:

First, a coordinate axis of a coordinate system which is fixed to the optical image display sections 26 and 28 will be described by taking a case of the right optical image display section 26 as an example, in preparation for the description of an automatic collection process of calibration data. In the present embodiment, a Z-axis of a coordinate system of the right optical image display section 26 is aligned with a normal direction of a display region visually perceived by a user US in a case where the user US appropriately wears the HMD 100. For this reason, the Z-axis may indicate a direction to which the face of the user US is directed. An X-axis is perpendicular to the Z-axis, and is substantially parallel to a direction in which the right optical image display section 26 and the left optical image display section 28 are arranged. For this reason, the X-axis may indicate the left-right direction of the user US. In addition, a Y-axis is perpendicular to both the Z-axis and the X-axis. For this reason, the Y-axis may indicate the up-down direction of the user US.

In the above-mentioned first setting mode, a user US transmits the establishment of alignment by the visual observation of a marker image IMG and real markers MK1 and MK2 to the parameter setting section 167 by operating a touch pad, pressing a button, or uttering a sound command. In a case where the parameter setting section 167 receives one of these operations or the sound command, the camera 60 images the marker MK1 or MK2, that is, collects calibration data. That is, the HMD 100 uses an operation or utterance by a user US as a trigger of the collection of calibration data. However, as described below, the HMD 100 may be configured such that calibration data is automatically collected, instead of having such a configuration.

Figure 14:
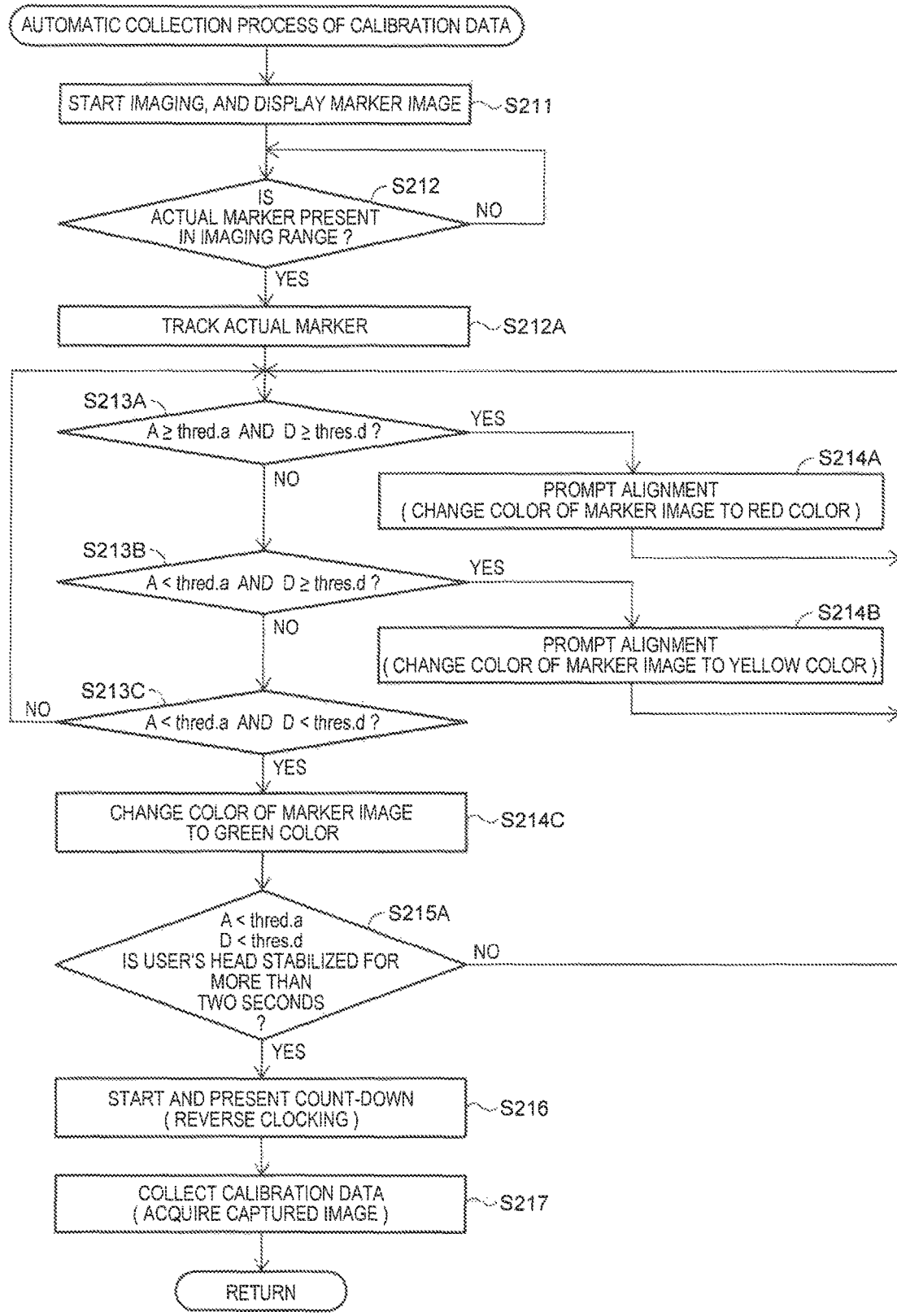
FIG. 14 illustrates a flow of an automatic collection process of calibration data according to an embodiment.

FIG. 14 illustrates a flow of an automatic collection process of calibration data according to an embodiment. In this process, first, the marker specification section 166 starts imaging, and one of the optical image display sections 26 and 28 (hereinafter, the right optical image display section 26) starts to display a marker image IMG (step S211). The marker specification section 166 executes binarization on each imaging frame imaged by the camera 60 to thereby extract a real marker MK2. The marker specification section 166 determines whether or not the real marker MK2 is included in an imaging range (step S212). In a case where the marker specification section 166 determines that the real marker MK2 is not included in the imaging range (step S212: NO), the marker specification section continuously monitors the detection of the real marker MK2 from the imaging range.

In the process of step S212, in a case where the marker specification section 166 determines that the real marker MK2 is included in the imaging range (step S212: YES), the marker specification section derives the position and pose of the real marker MK2 with respect to the camera 60 and starts to track the derived position and pose (step S212A).

The derived position and pose of the real marker MK2 are expressed by a camera coordinate system. In other words, the position and pose are a position and a pose with respect to the camera 60. Consequently, the position and pose of the real marker MK2 with respect to the camera 60 are transformed into an approximate position and pose which are expressed by a coordinate system of the right optical image display section 26, that is, a provisional position and pose, using a default spatial relationship between the camera 60 and the right optical image display section 26. The wording "default spatial relationship" refers to, for example, one spatial relationship which is present between both ends of a relative movable range between the camera 60 and the right optical image display section 26. A 4×4 transformation matrix T indicating a position and a pose, that is, rotation and translation is expressed as Expression (21A).

$$T(\text{marker to display}) = T(\text{camera to display}) * \text{Tracking pose} \quad (21A)$$

Here, "T(marker to display)" on the left side indicates an approximate position and pose of the real marker MK2 with respect to the right optical image display section 26, and "T (camera to display)" on the right side indicates a default transformation matrix from a coordinate system of the camera 60 to a coordinate system of the right optical image display section 26, and "Tracking pose" indicates the position and pose of the real marker MK2 with respect to the camera 60.

Whether or not rotation differences around the X-axis and the Y-axis in the coordinate system of the optical image display section 26 between a model marker and the real marker MK2 are less than a predetermined value may be determined as in the following Expression (21B) and Expression (21C).

$$\text{abs}(A_x - \text{approximated } A_x) < \text{threshold} \quad (21B)$$

$$\text{abs}(A_y - \text{approximated } A) < \text{threshold} \quad (21C)$$

Here, "$A_x$" and "$A_y$" indicate rotation angles of a model marker around the X-axis and the Y-axis, respectively. In addition, "approximated $A_x$" and "approximated $A_y$" indicate approximate rotation angles of the real marker MK2 around the X-axis and the Y-axis, and are Euler's angles that are all expressed in units of degrees. In addition, "Abs" means the taking of an absolute value of a value. Meanwhile, as described above, the model marker refers to a model expressed in a three-dimensional coordinate, and is to be projected to 2D and displayed as a marker image IMG.

Next, in the coordinate system of the right optical image display section 26, whether or not approximate translations ($T_x'$, $T_y'$) along the X-axis and the Y-axis of the real marker MK2 are close to translations ($t_x$, $t_y$) of a model marker may be determined using the following relational expressions of Expression (21D) and Expression (21E).

$$\frac{\text{Abs}(T_x' - t_x)}{t_x} < \text{threshold} \quad (21D)$$

$$\frac{\text{Abs}(T_y' - t_y)}{t_y} < \text{threshold} \quad (21E)$$

In the following description, the above-mentioned difference in rotation angle will be collectively referred to as a "rotation difference A", and the above-mentioned difference in translation will be collectively referred to as a "translation difference D".

Returning to the flow of FIG. 14, the marker specification section 166 determines whether or not the rotation difference A is equal to or greater than the threshold value (threshold) thereof and the translation difference D is equal to or greater than the threshold value thereof (step S213A). In a case where it is determined that both the rotation difference A and the translation difference D are equal to or greater than the respective threshold values (step S213A: Yes), the display image setting section 165 changes the color of a marker image to a red color, and displays a character image for promoting alignment on the right optical image display section 26 (step S214A). In a case where the determination result in step S213A is "negative" (step S213A: No), the marker specification section 166 determines whether or not the rotation difference A is less than the threshold value and the translation difference D is equal to or greater than the threshold value (step S213B). In a case where it is determined that the rotation difference A is less than the threshold value and the translation difference D is equal to or greater than the threshold value (step S213B: Yes), the display image setting section 165 changes the color of a marker image to a yellow color and displays a character image for promoting alignment on the right optical image display section 26 (step S214B). In a case where the determination result in step S213B is "negative" (step S213B: No), the marker specification section 166 determines whether or not the rotation difference A is less than the threshold value and the translation difference D is less than the threshold value (step S213C). In a case where it is determined that both the rotation difference A and the translation difference D are less than the respective threshold values (step S213C: Yes), the display image setting section 165 changes the color of a marker image to a green color (step 214C). In a case where the determination result in step S213C is "negative" (step S213C: No), a process to be executed next is returned to the determination of step S213A. After step S214C, the marker specification section 166 determines whether a state where both the rotation difference A and the translation difference D are less than the respective threshold values and a state where the head of a user US is stabilized have been continued, for example, for two seconds or more (step S215A). In a case where it is determined that the determination result in step S215A is affirmative, the parameter setting section 167 starts the clocking or reverse clocking during a predetermined period of time. The reverse clocking started by the parameter setting section 167 is referred to as a count-down process. The predetermined period of time according to the present embodiment is one second. The display image setting section 165 divides one second into three parts, and presents count-down information of "3", "2", "1", and "0" that are displayed or output as a sound with the lapse of time. The parameter setting section 167 acquires a captured image of the real marker MK2 which is obtained by the camera 60 as calibration data at a timing when "0" is presented.

The predetermined period of time in the count-down process is not limited to one second. It is preferable that the predetermined period of time is long to such a degree that a user US can improve alignment between the marker image IMG and the real marker MK2 by visual observation in terms of accuracy and is short to such a degree that the user US can maintain alignment therebetween by visual observation which is already established with a high level of accuracy. In this regard, "one second" is an empirically suitable length.

The parameter setting section 167 can determine whether a head is in a stabilized state or a substantially static state, from the position of a feature point of the real marker MK2 in a captured image obtained by the camera 60, the output of an IMU built into the HMD 100, and a combination thereof.

Figure 15:
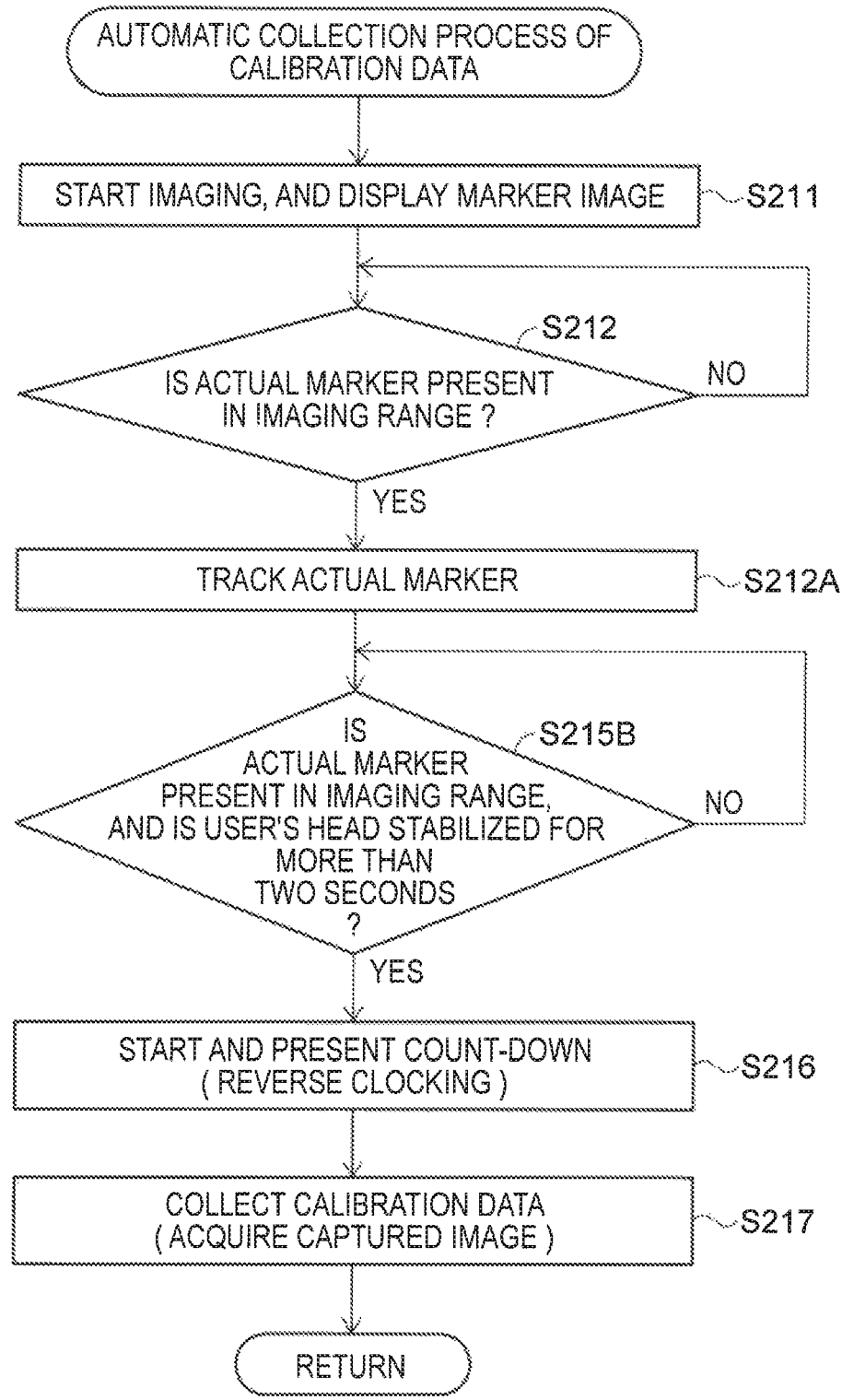
FIG. 15 illustrates a flow of an automatic collection process of calibration data according to another embodiment.

FIG. 15 illustrates a flow of an automatic collection process of calibration data according to another embodiment.

In the flow of FIG. 15, portions between step S212 and step S216 are different from those in the flow of FIG. 14, and the other portions are substantially the same as those in the flow of FIG. 14. Therefore, only different portions will be described below.

In the flow illustrated in FIG. 15, after step S212A, the parameter setting section 167 determines whether a real marker MK2 is present in an imaging range of the camera 60 and the head of a user US is in a stable state for a predetermined period of time, for example, two seconds (step S215B). In a case where the parameter setting section 167 determines that a real marker is present in the imaging range of the camera 60 and the head of the user US is in a stable state for two seconds (step S215B: Yes), the process proceeds to step S216. In a case where the determination result in step S215B is "negative", the parameter setting section 167 continuously monitors a captured image and the movement of the head of the user US until this determination is satisfied.

Figure 16:
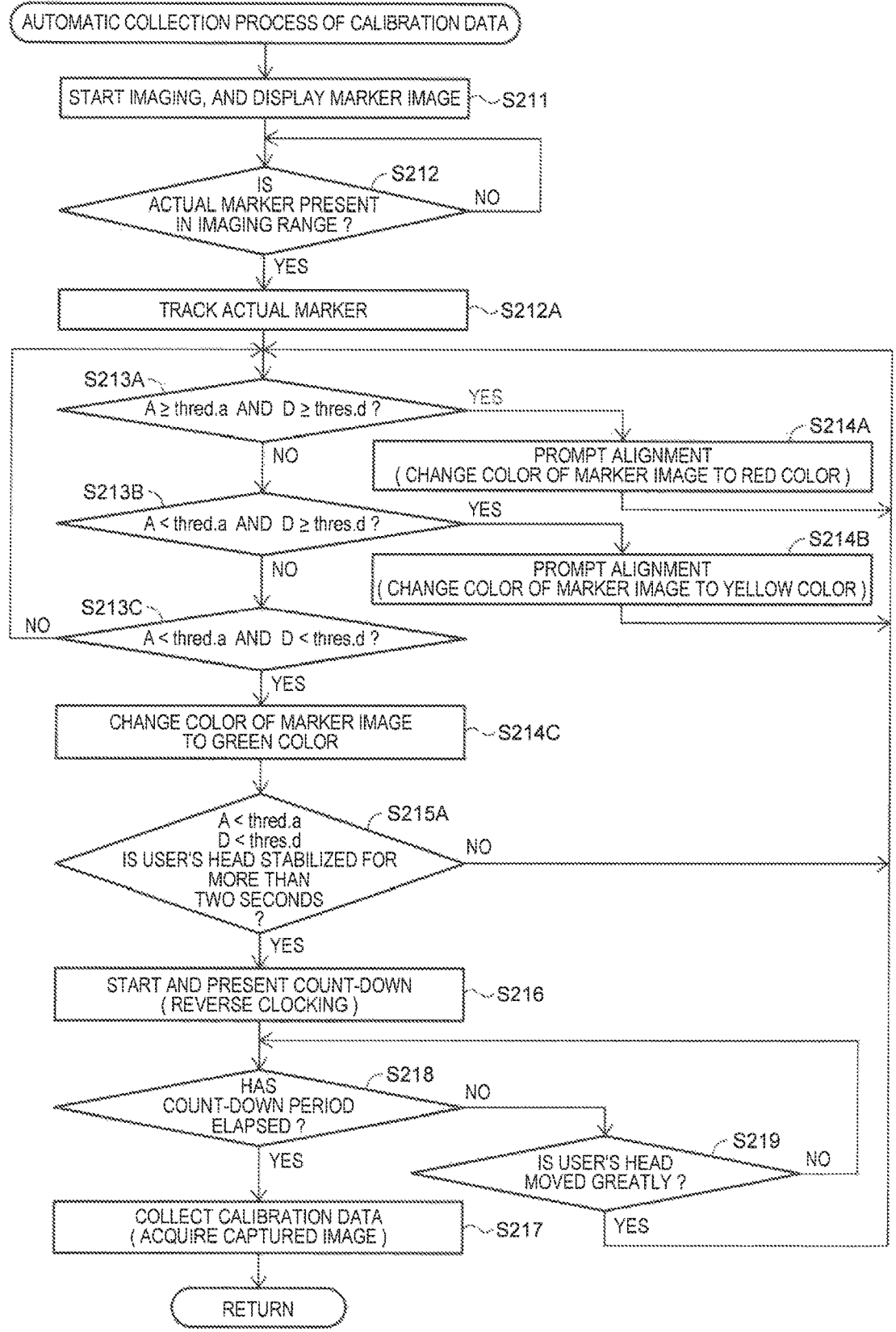
FIG. 16 illustrates a flow of an automatic collection process of calibration data according to another embodiment.

FIG. 16 illustrates a flow of an automatic collection process of calibration data according to another embodiment.

The flow of FIG. 16 is different from the flow of FIG. 14 in that determination steps S218 and S219 are added between step S216 and step S217 as compared to the flow of FIG. 14, and the other portions are substantially the same as those in the flow of FIG. 14. Therefore, only different portions will be described below.

In the process of FIG. 14, when a count-down process is started (step S216), calibration data is collected when a predetermined period of time elapses even when alignment by visual observation is not established any longer as a result of a great change in the pose of a user US. In this case, it is not possible to collect accurate calibration data. In the present embodiment, in a case where the movement of the head of the user US within a predetermined period of time in the count-down process has a value equal to or greater than a threshold value, it is possible to stop the count-down process and to perform a process of collecting calibration data again. Specifically, after the count-down process of step S216 is started, the parameter setting section 167 determines whether or not a predetermined period of time (count-down period) has elapsed (step S218). In a case where the determination result of the parameter setting section 167 in step S218 is "negative" (step S218: No), it is determined whether or not the movement of the head of the user US has a value equal to or greater than a threshold value, on the basis of an angular velocity or an acceleration which is output by an IMU (step S219). In a case where the determination result in step S219 is "negative", the parameter setting section 167 collects calibration data at a point in time when the predetermined period of time has elapsed (step S281: Yes) in the process of step S218 (step S217). In step S219, in a case where the parameter setting section 167 determines that the movement of the head of the user US has a value equal to or greater than a threshold value, the process of step S213A and the subsequent processes are performed.

As described above, when a parameter group is adjusted, it is preferable to collect calibration data in a state where a marker image IMG displayed on the HMD 100 and a real marker MK2 are visually perceived by a user US so as to be aligned with each other (alignment is established). Whether or not the marker image IMG and the real marker MK2 are visually perceived by the user US with a high level of accuracy affects the accuracy of calibration for deriving a parameter group.

However, when a user touches the control section 10 for an instruction or a trigger for data collection even when a marker image and a real marker are visually perceived by the user so as to be aligned with each other with a high level of accuracy, alignment deviates by the touch, and calibration data is collected (the real marker is imaged) in a state where the alignment deviates. The possibility of alignment deviating due to an utterance operation or a pronouncing operation even in a case of a sound command is not zero. When such a parameter group obtained in a state where alignment deviates is used, the superposition display of an AR image is not performed with a high level of accuracy.

In the automatic collection process of calibration data which is described with reference to FIGS. 14 to 16, it is possible to provide a configuration in which the HMD 100 can determine that a marker image and a real marker are visually perceived by a user so as to be aligned with each other even when the user does not necessarily perform a touch operation or give a sound command. In addition, calibration data can be collected using this determination as a trigger, and thus a highly-accurate parameter group is obtained. As a result, it is possible to obtain the HMD 100 in which the superposition display of an AR image is performed with a high level of accuracy. Meanwhile, in the present embodiment, it is determined whether or not a "rotation difference A" is less than a threshold value on the basis of a difference between two rotation angles. However, it may be determined whether or not the "rotation difference A" is less than a threshold value on the basis of a difference between rotation angles around one axis or a difference between rotation angles around three axes. The same is true of a "translation difference D".

A-2-3. Second Setting Mode:

In a second setting mode, the parameter setting section 167 receives an operation of a user US with respect to results of the calibration executed in a first setting mode and corrects the results of the calibration. In other words, the parameter setting section 167 corrects the position, size, and depth perception of an AR image (AR model) which is displayed in association with a specific object, on the basis of the received operation.

Figure 17:
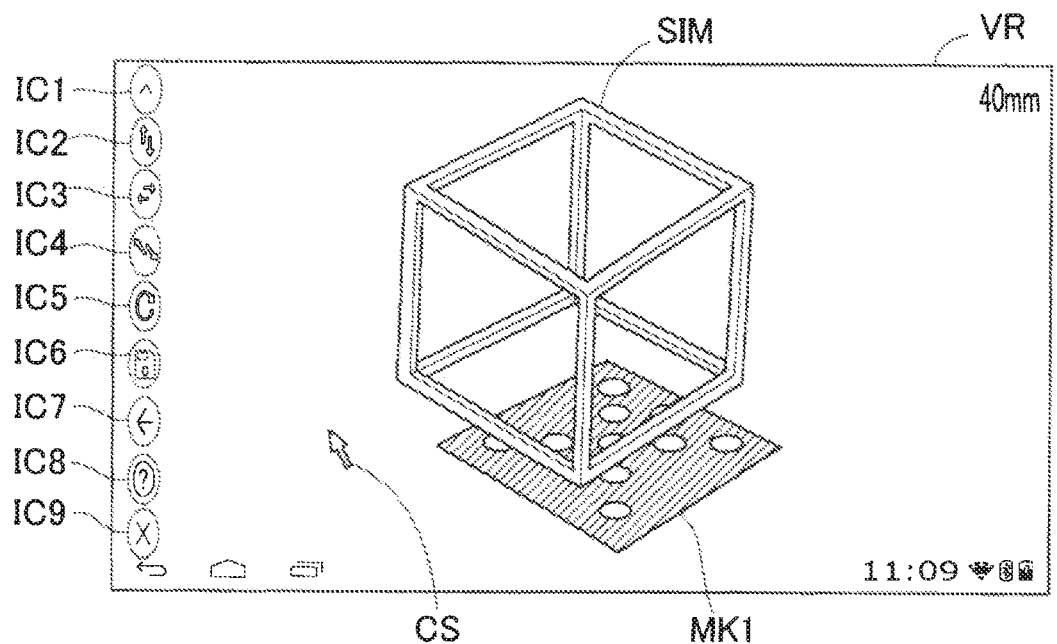
FIG. 17 is a diagram illustrating an example of a field of view which is visually perceived by a user in the case of transitioning to a second setting mode.

FIG. 17 is a diagram illustrating an example of a field of view VR which is visually perceived by a user US in a case of transitioning to a second setting mode. FIG. 17 illustrates a real marker MK1 as a specific object included in an outside scene which is passed through, a setting image SIM which is displayed on the optical image display sections 26 and 28 in association with the real marker MK1, and eight icons and a cursor image CS which are displayed on the optical image display sections 26 and 28 in a second setting mode. The eight icons are icons for changing a setting mode in the second setting mode by an operation received by the operation input section 135 of the control section 10. In the example illustrated in FIG. 17, the position of the real marker MK1 of the outside scene and the position of the bottom of a regular hexahedron which is the displayed setting image SIM do not overlap each other when seen from a user. In other words, the accuracy of calibration is not sufficient. In this case, in the present embodiment, a user US can correct results of calibration performed on the real marker MK1 and the setting image SIM by operating the operation input section 135 in the second setting mode.

When a track pad of the operation input section 135 receives a predetermined operation, the parameter setting section 167 moves the position of the cursor image CS displayed on the optical image display sections 26 and 28. When a decision button of the operation input section 135 is pressed down in a state where the cursor image CS overlaps any of the eight icons, the parameter setting section 167 transitions to a setting mode which is associated with the icon overlapping the cursor image CS.

An icon IC1 is an icon for transitioning to a mode for enlarging or reducing the setting image SIM when being selected. In a mode of the icon IC1, the operation input section 135 receives a predetermined operation, and thus the parameter setting section 167 changes the size of the setting image SIM displayed on the optical image display sections 26 and 28 by correcting either one or both of the above-mentioned camera parameter CP and transformation parameter. In the present embodiment, the parameter setting section 167 adjusts the size of the setting image SIM by correcting either one or both of focal lengths $F_x$ and $F_y$ in the camera parameter CP and focal lengths $F_x$ and $F_y$ in the projection parameter. A user US can change the size of the setting image SIM so as to be aligned with the size of the real marker MK1 by selecting the icon IC1.

An icon IC2 is an icon for transitioning to a mode for vertically moving the display position of the setting image SIM when being selected. In a mode of the icon IC2, the operation input section 135 receives a predetermined operation, and thus the parameter setting section 167 corrects transformation parameters of the respective optical image display sections 26 and 28, so that the optical image display sections 26 and 28 vertically move the setting image SIM in a displayable range. In the present embodiment, the parameter setting section adjusts a parameter Rx indicating rotation around the X-axis among the transformation parameters to thereby vertically (that is, in the Y-axis direction) move the setting image SIM. Meanwhile, in the display of the transformation parameter, X and Y indicate the X-axis and the Y-axis of a coordinate system fixed to the optical image display sections 26 and 28. Furthermore, as described above, the X-axis may indicate the left-right direction of a user US wearing the HMD 100, and the Y-axis may indicates the up-down direction.

An icon IC3 is an icon for transitioning to a mode for horizontally moving the display position of the setting image SIM when being selected. In a mode of the icon IC3, the operation input section 135 receives a predetermined operation, and thus the parameter setting section 167 corrects transformation parameters of the respective optical image display sections 26 and 28, and the optical image display sections 26 and 28 horizontally move the setting image SIM in a displayable range. In the present embodiment, the parameter setting section 167 adjusts a parameter $R_y$ indicating rotation around the Y-axis among the transformation parameters to thereby horizontally (that is, the X-axis direction) move the setting image SIM. A user US can change the display position of the setting image SIM so as to align the position of the setting image SIM with the real marker MK1 by selecting the icon IC2 and the icon IC3.

An icon IC4 is an icon for adjusting the depth perception of the setting image SIM which is visually perceived by a user US when being selected. In a mode of the icon IC4, the operation input section 135 receives a predetermined operation, and thus the parameter setting section 167 adjusts Cx which is an X component of a display principal point in projection parameters of the respective optical image display sections 26 and 28 to thereby change the depth perception of the setting image SIM. When the amount of adjustment of the depth perception is set to be ΔCx, the display principal point of the right optical image display section 26 is set to be Cx_right, and the display principal point of the left optical image display section 28 is set to be Cy_left, the display principal points after the adjustment of the depth perception are expressed as the following Expression (21F) and Expression (21G), respectively.

$$Cx\_left = Cx\_left + \Delta Cx \quad (21F)$$

$$Cx\_right = Cx\_right - \Delta Cx \quad (21G)$$

In the expression of the projection parameter, X indicates the X-axis of a coordinate system fixed to the optical image display sections 26 and 28. As described above, the X-axis in this case may indicate the left-right direction of a user US wearing the HMD 100. According to Expression (21F) and Expression (21G), center positions of right and left image regions displayed on the right and left optical image display sections 26 and 28 vary, and thus the right and left image regions come close to or recede from each other. As a result, when the user US observes the right and left image regions with both eyes, the user can visually perceive an AR image (AR object) at an appropriate convergence angle depending on a distance of a specific object. For this reason, depth perceptions of the specific object and the AR image are aligned with each other therebetween.

An icon IC5 is an icon for returning the correction of a parameter group having been executed so far to the value of the parameter group before the execution, when being selected. An icon IC6 is an icon for updating the correction of a parameter group having been executed so far as a new parameter group (a camera parameter CP, a transformation parameter, and a projection parameter) and storing the new parameter group, when being selected.

An icon IC7 is an icon for returning to the last mode which precedes the second setting mode, when being selected. In other words, when the icon IC7 is selected, the display image setting section 165 displays a selection screen regarding to which setting mode of the second setting mode and the first setting mode illustrated in step SS13 of FIG. 9 the transition is performed, on the optical image display sections 26 and 28.

An icon IC8 is an icon for causing the display image setting section 165 to display "help" which is an explanation on the optical image display sections 26 and 28, when being selected. When "help" is displayed, an explanation regarding an operation for executing calibration in a second setting mode and a calibration execution process is displayed on the optical image display sections 26 and 28. An icon IC9 is an icon for terminating a calibration execution process including a second setting mode, when being selected.

Figure 18:
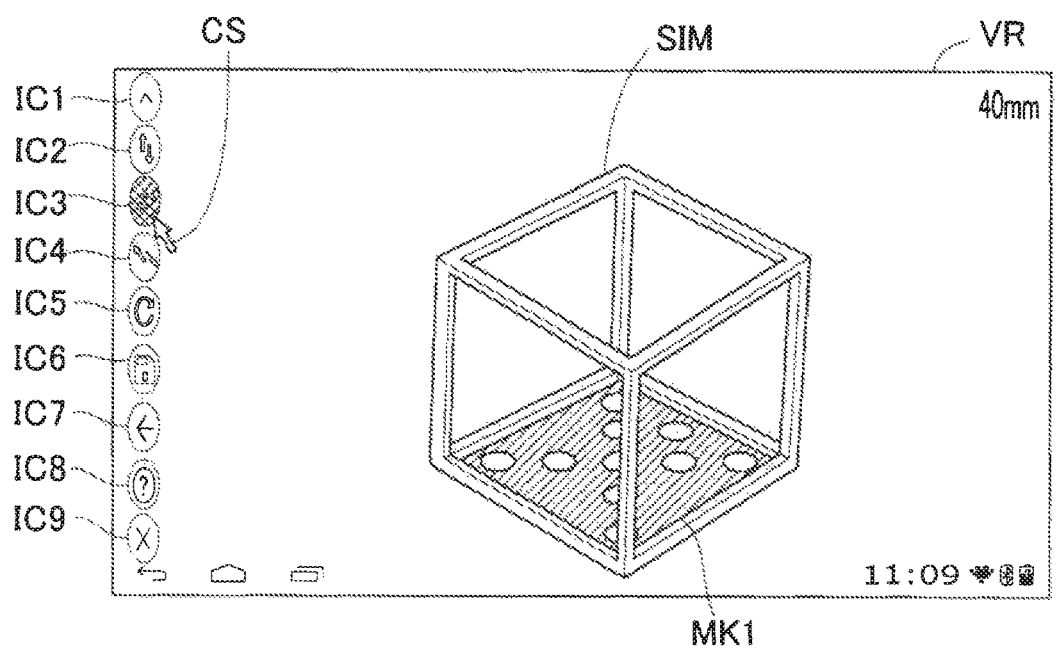
FIG. 18 is a diagram illustrating an example of a field of view which is visually perceived by a user when the display position of a setting image is changed in the second setting mode.

FIG. 18 is a diagram illustrating an example of a field of view VR which is visually perceived by a user US when the display position of a setting image SIM is changed in a second setting mode. In this example, the orientation, size, and depth perception of the setting image SIM already match those of a real marker MK1, and the superposition accuracy of an AR image is improved by adjusting only display positions in horizontal and up-down directions. FIG. 18 illustrates a state where the display position of the setting image SIM is set so that the position of the bottom of a regular hexahedron which is the setting image SIM is aligned with the position of the real marker MK1, by a predetermined operation being received by the operation input section 135 after an icon IC2 and an icon IC3 are selected in the second setting mode. As a specific operation, first, the display position of the setting image SIM in the up-down direction is aligned with the real marker MK1 by the icon IC2 being selected, and the display position of the setting image SIM in the left-right direction is aligned with the real marker MK1 by the icon IC3 being selected. Thereafter, when an icon IC5 is selected, a transformation parameter is updated and stored.

Figure 19:
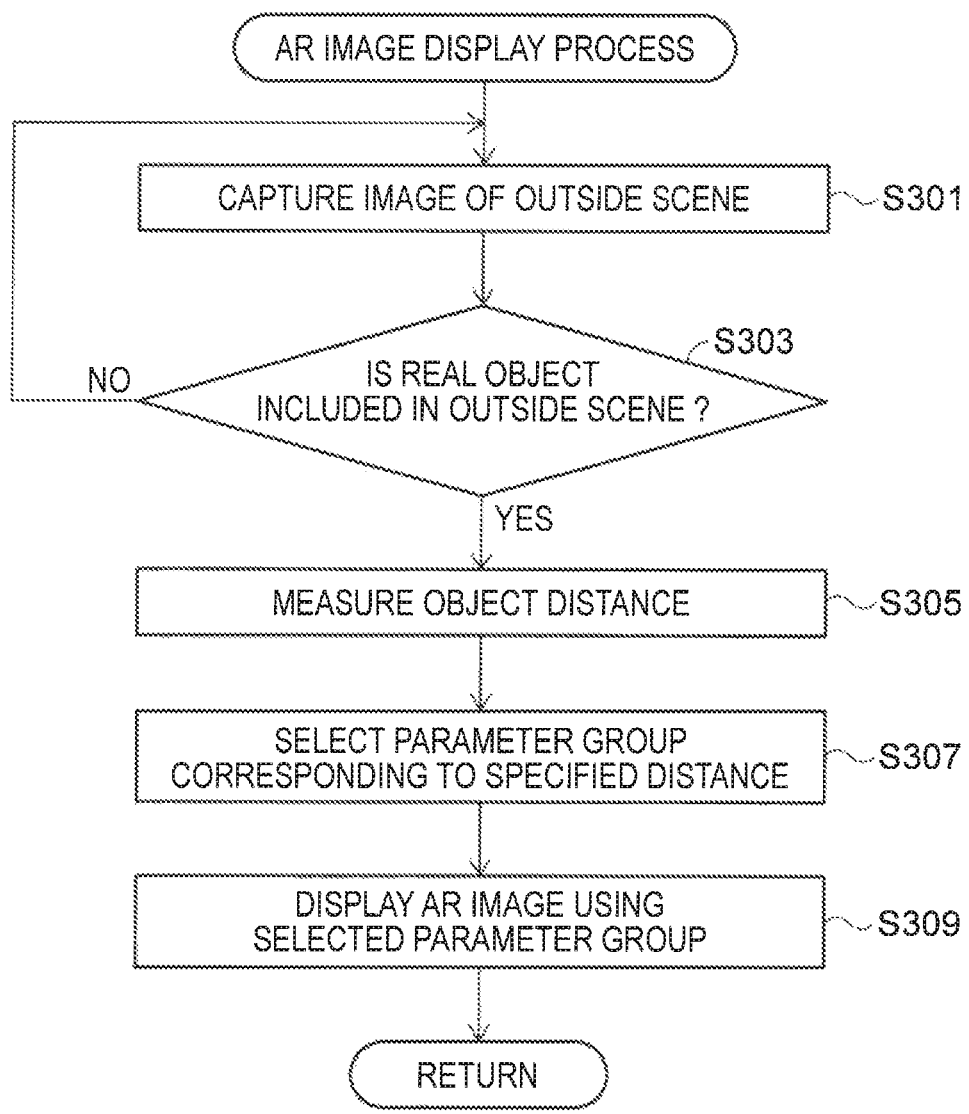
FIG. 19 is a flow chart illustrating an AR image display process.

A-3. AR Image Display Process:

FIG. 19 is a flow chart illustrating an AR image display process. Prior to the process illustrated in FIG. 19, a user sets a virtual distance of a model marker so that the model marker and a real marker conform to each other in each of distance ranges illustrated in FIG. 22 to be described later, and then performs calibration in at least one of the above-mentioned first and second setting modes with respect to each of the distance ranges. Thereby, parameter groups PM1, PM2, and PM3 corresponding to each of the distance ranges are derived and are stored in a predetermined storage section. In the AR image display process, the display image setting section 165 displays an AR image associated with a specific object in advance on the optical image display sections 26 and 28 using a parameter group which is selected by the parameter setting section 167 on the basis of an object distance. The parameter setting section 167 of this embodiment sets parameter groups corresponding to three cases of a case where an object distance is equal to or greater than 0.5 meter (m) and less than 1 m, a case where an object distance is equal to or greater than 1 m and less than 4 m, and a case where an object distance is equal to or greater than 4 m, using the above-mentioned method of acquiring calibration data. In the AR image display process, a description will be given using a real object OB1 as an example of a specific object and an AR image IG1 associated with the real object OB1.

The CPU 140 performs an AR image display process when a predetermined application is selected through the operation input section 135. In the AR image display process, first, the parameter setting section 167 captures an image of an outside scene using the camera 60 (step S301). The parameter setting section 167 determines whether or not the real object OB1 stored in the marker image storage section 138 is included in the outside scene which is an object to be captured through pattern matching or the like (step S303). In a case where the parameter setting section 167 determines that the real object OB1 is not included in the outside scene as an object to be captured (step S303: NO), the parameter setting section repeats the process of step S301 and the subsequent processes until the real object OB1 is detected from the outside scene which is an object to be captured.

In the process of step S303, in a case where the parameter setting section 167 determines that the real object OB1 is included in the outside scene which is an object to be captured (step S303: YES), the parameter setting section calculates an object distance on the basis of trigonometry using two captured images of the camera 60 (step S305). The parameter setting section 167 selects a parameter group corresponding to the calculated object distance (step S307). In this embodiment, a description will be given on the assumption that the selected parameter group is a first parameter group PM1 in which an object distance is equal to or greater than 0.5 m and less than 1 m. The display image setting section 165 displays the AR image IG1 on the optical image display sections 26 and 28 with a position and a pose that are visually perceived by a user US so that the AR image IG1 conforms to the position and pose of the real object OB1, using the first parameter group PM1 (step S309), and the CPU 140 terminates the AR image display process.

Figure 20:
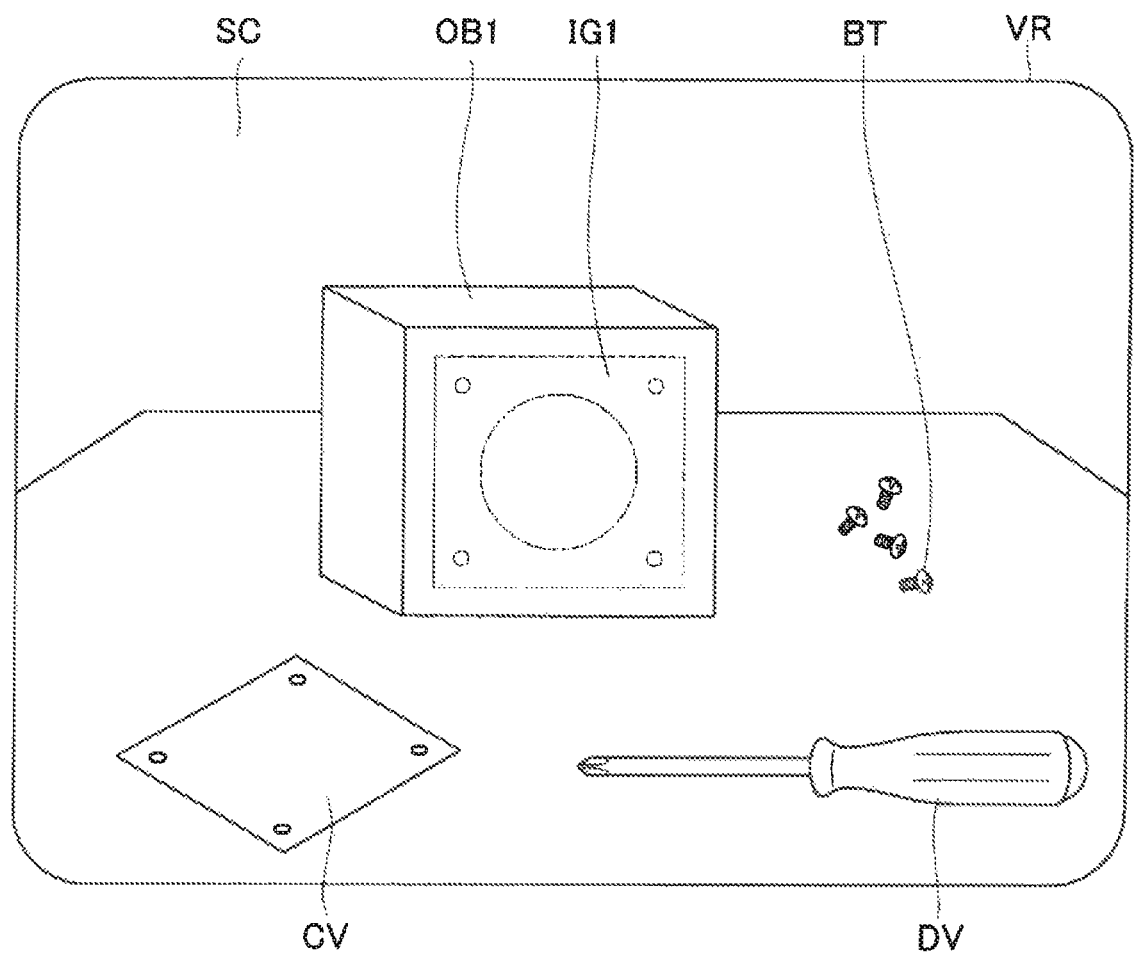
FIG. 20 is a diagram illustrating an example of a field of view which is visually perceived by a user when an AR image using a first parameter group is displayed.

FIG. 20 is a diagram illustrating an example of a field of view VR which is visually perceived by a user US when an AR image IG1 using a first parameter group PM1 is displayed. FIG. 20 shows a state before the user US performs work using parts placed on a desk. An outside scene SC visually perceived by the user includes a rectangular cover CV, a housing (real object OB1) which has a rectangular parallelepiped shape and from which the cover CV on the front surface thereof is removed, and a plurality of bolts BT, and a screwdriver DV for turning the bolt BT. In this embodiment, the parameter setting section 167 detects the housing from which the cover CV is removed, as the real object OB1. The bolt BT is a part which is used to mounting the cover CV on the housing.

As illustrated in FIG. 20, the user US visually perceives the AR image IG1 displayed on the optical image display sections 26 and 28, in addition to the outside scene SC passing through the optical image display sections 26 and 28. The AR image IG1 is an image of the cover CV in a case where the cover CV is mounted on the real object OB1. In other words, the display image setting section 165 displays the AR image IG1 on the optical image display sections 26 and 28 in association with the position and pose of the real object OB1, using the first parameter group PM1. The parameter setting section 167 can make the user US visually perceive the depth of the AR image IG1 by making the AR image IG1 displayed on the right optical image display section 26 and the AR image IG1 displayed on the left optical image display section 28 different from each other to form a convergence angle.

Figures 21, 22:
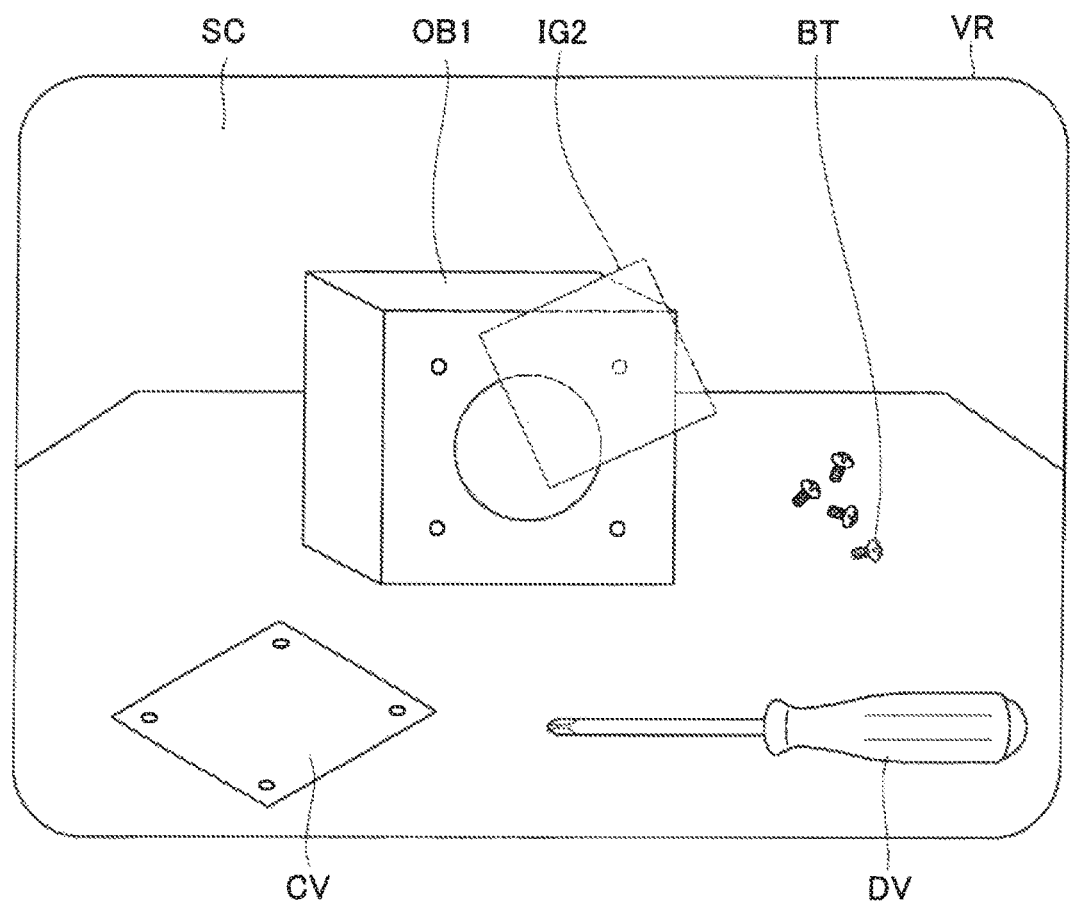
FIG. 21 is a diagram illustrating an example of a field of view which is visually perceived by a user when an AR image using a third parameter group is displayed.
FIG. 22 is a table of a list showing an example in a case where a plurality of parameter groups are used.

FIG. 21 is a diagram illustrating an example of a field of view VR which is visually perceived by a user US when an AR image IG1 using a third parameter group PM3 is displayed. In the field of view VR illustrated in FIG. 21, an AR image IG2 displayed on the optical image display sections 26 and 28 in association with a real object OB1 is different from that in the field of view VR illustrated in FIG. 20. In the example illustrated in FIG. 21, the display image setting section 165 displays the AR image IG2 on the optical image display sections 26 and 28 using the third parameter group PM3 in a case where an object distance of the real object OB1 is equal to or greater than 4 m, regardless of the object distance being equal to or greater than 0.5 m and less than 1 m. For this reason, in the AR image IG2, a display position and a size do not conform to the position and pose of the real object OB1, as compared to the AR image IG1 of FIG. 20. In the AR image IG1 of FIG. 21 and the AR image IG2 of FIG. 22, the same 3D models are displayed at different positions so as to have different sizes and poses.

FIG. 22 is a table of a list showing an example in a case where a plurality of parameter groups are used. As shown in FIG. 22, it is preferable that a first parameter group PM1 used in a case where an object distance is equal to or greater than 0 m and less than 1 m is used to display an AR image IG1 in a case where a user US performs an operation within arm's reach. It is preferable that a parameter group PM2 used in a case where an object distance is equal to or greater than 1 m and less than 4 m is used to display an AR image IG1 in a case where a user US performs an indoor operation beyond the user's hand. It is preferable that a third parameter group PM3 used in a case where an object distance is equal to or greater than 4 m is used to display an AR image IG1 in a case where a user US performs an outdoor operation. The third parameter group PM3 may be used in a case where the user US visually perceives a picture positioned away from the user in an art museum or the like. The distance illustrated in FIG. 22 is rounded off to one decimal place. In addition, as described above, in a case where a spatial relationship between the camera 60 and the image display section 20 is known already or in a case of a default spatial relationship, the CPU 140 can calculate a distance between the image display section 20 and a real object on the basis of the spatial relationship, and thus the CPU may select one of the parameter groups PM1, PM2, and PM3 on the basis of the distance between the image display section 20 and the real object.

As described above, in the HMD 100 of this embodiment, the parameter setting section 167 specifies an object distance of a real object OB1 included in an outside scene which is imaged and the pose of the real object OB1. In addition, the parameter setting section 167 selects one parameter group from a plurality of parameter groups in accordance with the object distance. The display image setting section 165 sets the position and pose of the real object OB1 and the position and pose of an AR image IG1 associated with the real object using the selected parameter group to display the AR image IG1 on the optical image display sections 26 and 28 (image display section 20). For this reason, in the HMD 100 of this embodiment, the display image setting section 165 displays the AR image IG1 on the image display section 20 using a parameter group which is suitable for the object distance of the real object OB1 included in the outside scene which is imaged. Thereby, the HMD 100 can make a user US visually perceive the AR image IG1 of which the position and pose are set so as to conform to the position and pose of the real object OB1. In other words, it is possible to make the user US visually perceive the AR image IG1 in which the accuracy of each of the position and the pose thereof is improved, which leads to an improvement in user convenience.

In addition, in the HMD 100 of this embodiment, the parameter setting section 167 calculates an object distance of the real object OB1 on the basis of trigonometry using a captured image of the camera 60. Each of the parameter groups PM1, PM2, and PM3 includes a camera parameter CP, a transformation parameter, and a projection parameter. The display image setting section 165 makes an AR image displayed on the right optical image display section 26 and an AR image displayed on the left optical image display section 28 different from each other using a projection transformation parameter to thereby form a convergence angle, and thus it is possible to make a user US visually perceive an AR image IG1 as a three-dimensional image. For this reason, in the HMD 100 of this embodiment, it is possible to make the user recognize the depth of the AR image IG1.

In addition, in the HMD 100 of this embodiment, the parameter setting section 167 sets parameter groups PM1, PM2, and PM3 corresponding to three cases of a case where an object distance is equal to or greater than 0.5 m and less than 1 m, a case where an object distance is equal to or greater than 1 m and less than 4 m, and a case where an object distance is equal to or greater than 4 m. For this reason, in the HMD 100 of this embodiment, a parameter group is set by distinguishing object distances of three types of operations, which are frequently performed by a user US, from each other, and thus the convenience of the user US is improved.

B. Second Embodiment

Figure 23:
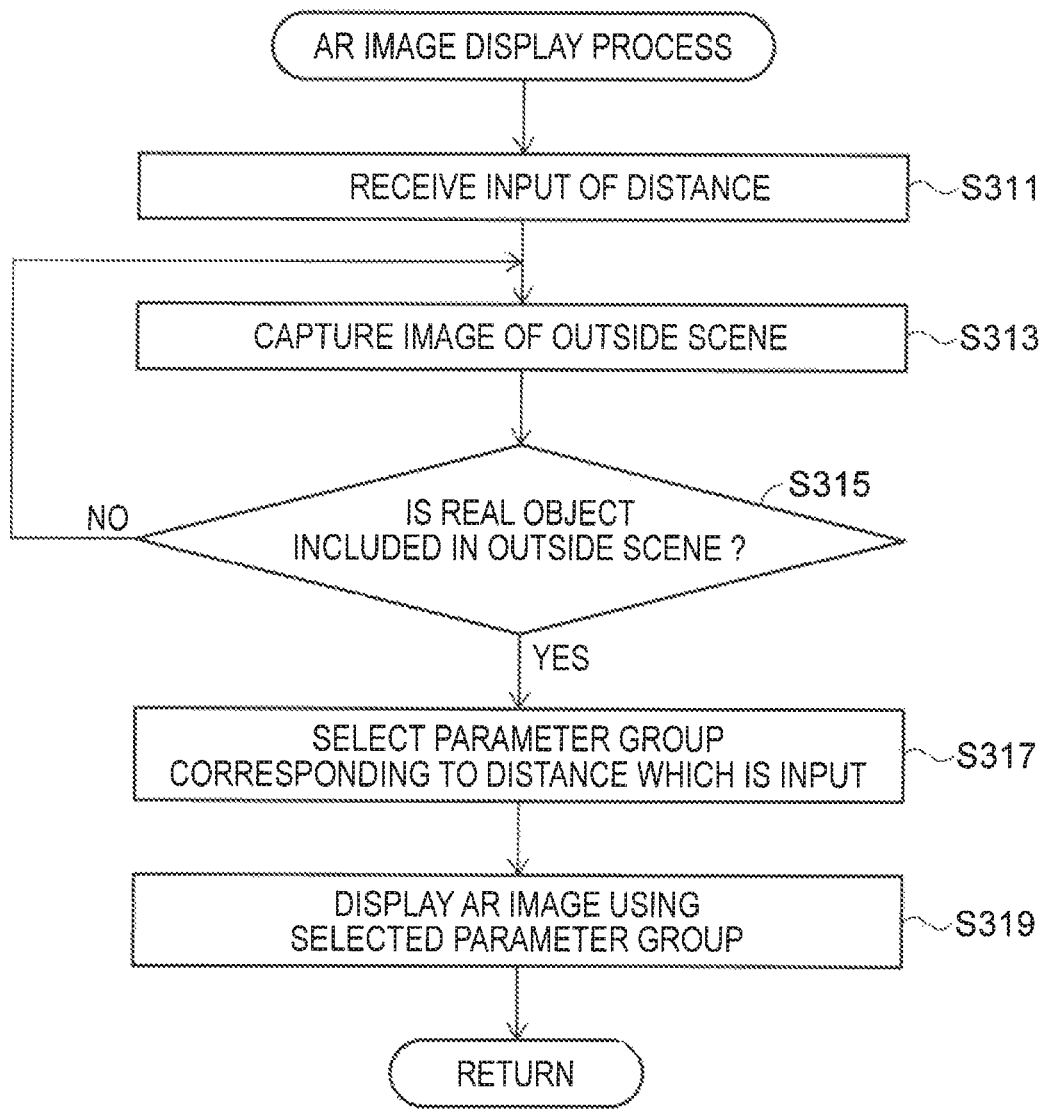
FIG. 23 is a flow chart illustrating an AR image display process according to a second embodiment.

FIG. 23 is a flow chart illustrating an AR image display process according to a second embodiment. The AR image display process of the second embodiment is different from the AR image display process (FIG. 19) of the first embodiment in that an object distance is set by an input received by an operation input section 135, and other processes thereof are the same as those in the AR image display process of the first embodiment.

In the AR image display process of the second embodiment, first, the operation input section 135 receives an input of an object distance (step S311). In other embodiments, an object distance may be input by an input of a sound. Next, a parameter setting section 167 captures an image of an outside scene using a camera 60 (step S313). The parameter setting section 167 determines whether or not a real object OB1 is included in the outside scene which is imaged (step S315). In a case where the parameter setting section 167 determines that the real object OB1 is not included in the outside scene which is imaged (step S315: NO), the parameter setting section repeats the process of step S313 and the subsequent processes. In the process of step S315, in a case where the parameter setting section 167 determines that the real object OB1 is included in the outside scene which is imaged (step S315: YES), the parameter setting section selects a parameter group corresponding to the object distance which is input (step S317). A display image setting section 165 displays an AR image on optical image display sections 26 and 28 using the selected parameter group (step S319), and a CPU 140 terminates the AR image display process.

As described above, in the HMD 100 of the second embodiment, an object distance used to select a parameter group is input by an operation. In this manner, for the setting of an object distance, other values such as input information may be used instead of using an actually measured distance.

C. Modification Example

Meanwhile, the invention is not limited to the above-described embodiments, and can be implemented in various aspects without departing from the scope of the invention. For example, the following modifications can also be made.

C-1. Modification Example 1

In the above-described embodiments, a description has been given by taking the three parameter groups illustrated in FIG. 22 as an example of a plurality of parameter groups, but various modifications can be made to the plurality of parameter groups. For example, two parameter groups may be set with 4 m as a boundary. In addition, as a parameter group of less than 0.5 m, a parameter group PM1 may be used, or more than three types of parameter groups or less than three types of parameter groups may be set.

In the above-described embodiments, although the parameter setting section 167 sets the plurality of parameter groups PM1, PM2, and PM3 by collecting calibration data, a plurality of parameters may be acquired by communication from a database such as a server without being set by the HMD 100 itself.

In the above-described embodiments, although the parameter setting section 167 calculates an object distance on the basis of trigonometry using a captured image of the camera 60 which is a stereo camera, various modifications can be made to a method of specifying an object distance. For example, an object distance may be specified by means of a distance measuring sensor using infrared rays.

In the above-described embodiments, although the display image setting section 165 displays the AR image IG1 on the optical image display sections 26 and 28 so that the position and pose of the real object OB1 conform to the position and pose of the AR image IG1 as illustrated in FIG. 20, various modifications can be made to elements for conformance. For example, the display image setting section 165 may make the position of the real object OB1 conform to the position of the AR image IG1 and may not make the poses thereof conform to each other. In other words, the display image setting section 165 may associate at least one of the position, size, pose, and depth perception of the real object OB1 with one of the position, size, pose, and depth perception of the AR image IG1 displayed on the optical image display sections 26 and 28.

In the above-described embodiments, although an object distance and the like are specified using the camera 60, an object distance and the like may be specified using a device other than the camera 60. For example, when parameter groups PM1, PM2, and PM3 are set in advance, one of the above-mentioned three parameter groups is selected by using a depth sensor instead of the camera 60. As a result, a display image may be set.

C-2. Modification Example 2

In the above-described embodiments, as illustrated in FIGS. 1 to 3, a description has been given of the HMDs 100 in which the position and orientation of the camera 60 with respect to the optical image display sections 26 and 28 change. The calibration described in the above-described embodiment is also effective in an HMD 101 in which the position of the camera 60 with respect to the optical image display sections 26 and 28 does not change. Meanwhile, hereinafter, the HMD 100 described in the above-described embodiment is also referred to as a "camera movable HMD", and the HMD 101 in which the position of the camera 60 is fixed is also referred to as a "camera fixed HMD".

FIG. 24 illustrates tables showing elements related to parameters that are set in a first setting mode. In a case where a transformation parameter is set in the first setting mode, it is possible to make a selection of a distance from the optical image display sections 26 and 28 to a specific object, a selection regarding which parameter is preferentially optimized, and the like.

As illustrated in FIG. 24, "display of a marker image IMG" includes two display modes of a both-eyes display and a single-eye display. The both-eyes display indicates a case where a marker image IMG is simultaneously displayed on the right optical image display section 26 and the left optical image display section 28 and a user US performs alignment therebetween. The single-eye display indicates a case where a marker image IMG is displayed on the right optical image display section 26 or the left optical image display section 28 and a user US separately performs alignment on the right optical image display section 26 and the left optical image display section 28. In a camera movable HMD which is the HMD 100 according to the above-described embodiment and a camera fixed HMD which is the HMD 101, a single-eye display is adopted.

The "structures of a real marker and a model marker" include "2D" using a two-dimensional object (a plane figure or the like) and "3D" using a three-dimensional object, as a model marker and real markers MK1, MK2, MK3, and MK4 serving as the base of the marker image IMG. In a camera movable HMD which is the HMD 100 and a camera fixed HMD which is the HMD 101, a marker image IMG obtained by projecting a two-dimensional model marker, and two-dimensional real markers MK1 and MK2 may be adopted as described in the above-described embodiment.

The "position and pose of a model marker (marker image IMG)" indicates whether a marker image IMG displayed on the optical image display sections 26 and 28 is fixedly displayed on the optical image display sections 26 and 28 or is customized when a user US performs alignment, which will be described in detail below.

An image processing section 160 includes a rendering engine used to display a model marker, and OpenGL in the rendering engine generates CG using a matrix product of "PVM". Here, P indicates a projection parameter, V denotes the position and pose of a model marker with respect to the optical image display sections 26 and 28, and M denotes internal coordinates of the model marker (3D model). In a case where a marker image having a model marker projected thereto is desired to be rendered (drawn) for alignment by visual observation of a user US, V may be limited to, for example, [I:0, 0, d1] as in the above-described embodiment. Meanwhile, here, I denotes a unit matrix and is rotation expressed by a coordinate system of the optical image display section 26 or 28, and d of (0, 0, d) is an alignment distance and is translation expressed by a coordinate system of the optical image display section 26 or 28.

Customized alignment means that an existing or default parameter group is used as V instead of using a fixed V and the positions and poses (hereinafter, tracking poses) of the real markers MK1 and MK2, which are tracked at a point in time when a user US fixes the tracking of the positions and poses, are used.

$$V = H \cdot T \tag{21H}$$

In Expression (21H), T indicates a tracking pose (position and pose with respect to the camera 60) which is obtained by tracking through the camera 60, and H indicates a transformation matrix (spatial relationship) between a present or default camera and a display.

Advantages of the customized alignment are illustrated as follows.

(1) A case of a camera movable HMD in which a spatial relationship between a camera 60 and optical image display sections 26 and 28 changes greatly depending on a user' wearing condition and a distance range of an AR scenario: in a certain case, there is the possibility that a calibration process according to the present embodiment cannot be successfully performed using either one of real marker MK1 or MK2, having different sizes, which are located at corresponding distances. This is because the camera 60 may not view (complement) the real markers MK1 and MK2. The real marker MK1 or MK2 may deviate from a captured image obtained by the camera 60 to the upper or lower outside portions thereof. In this case, the prompting of a user US to select an alignment distance is a solution.

(2) A case where a user US desires to achieve a higher superposition accuracy of an AR image for a distance of a specific AR scenario, particularly, a case where a distance that the user US is interested in is not in a calibration range: in a case where the user US obtains accuracy in a wide distance range, the user can rather select a plurality of distances within the range, and can perform alignment a plurality of times.

(3) In a case where a user US uses a 3D object created by himself or herself as a real marker, the user US needs to define (determine) an alignment distance.

Referring back to FIG. 24, a "parameter to be adjusted" indicates a parameter which is adjusted in a calibration process. As described later, a camera parameter CP of the camera 60 included in the HMD 100 does not necessarily need to be adjusted. In addition, even in a case of a camera fixed HMD, it may be preferable to adjust a transformation parameter indicating a spatial relationship (rotation and translation) between the camera 60 and the optical image display sections 26 and 28.

C-3. Modification Example 3

Factory Calibration (Initial Calibration) of Optical Image Display Sections 26 and 28 and a Camera 60:

For example, in a service station, a camera parameter CP of the camera 60, a spatial relationship (transformation parameter) between the camera 60 and the optical image display sections 26 and 28, and initial values (default values) of projection parameters of the optical image display sections 26 and 28 may be derived by a process having the following steps.

1. Calibration of a high-resolution measuring camera is separately performed.

2. Calibration of the camera 60 included in the HMD 100 is separately performed to thereby derive a camera parameter CP.

3. The HMD 100 and the measuring camera are set up on a special jig. A planar pattern is installed as a world coordinate system.

4. Several positions are defined on the jig with respect to the measuring camera. In addition, the position and pose of the measuring camera with respect to the planar pattern are estimated at each of the positions.

5. An imaginary pattern having an imaginary position and pose with respect to the optical image display section 26 is projected to the optical image display section 26. Meanwhile, the imaginary position and pose with respect to the optical image display section 26 are the same as the position and pose of a planar pattern with respect to the optical image display section 26.

6. The measuring camera is moved to the defined plurality of positions, and an image of the imaginary pattern displayed on the optical image display section 26 is captured at each of the positions.

7. A 3D position which is projected using the captured images is reconstructed.

8. An internal parameter (projection parameter) of the optical image display section 26 is estimated using a 2D-3D correlation.

9. The poses of two cameras (the camera 60 and the measuring camera) with respect to the planar pattern are calculated, and a transformation parameter between the camera 60 and the optical image display section 26 is solved.

10. The steps of 4 to 9 are repeated with respect to the optical image display section 28.

C-4. Modification Example 4

A camera movable HMD which is the HMD 100 and a camera fixed HMD which is the HMD 101 are different from each other in the presence or absence of changes in the position and orientation of a camera 60 with respect to optical image display sections 26 and 28. For this reason, in the camera fixed HMD and the camera movable HMD, a parameter which is preferentially optimized may be changed to a different parameter in a first setting mode. For example, in the camera fixed HMD, a camera parameter CP may be optimized by calibration, with respect to the camera movable HMD.

A parameter to be optimized includes a camera parameter CP and a transformation parameter. In the camera fixed HMD, a camera parameter CP is optimized by calibration by using a design value during the manufacture of the HMD 101 as a fixed value. A camera parameter CP to be optimized includes a focal length of the camera 60 and a principal point position (center position of a captured image) of the camera 60. In the camera fixed HMD, a transformation parameter to be optimized includes a rotation parameter and a translation parameter of each of X, Y, and Z axes of each of the right optical image display section 26 and the left optical image display section 28.

In the camera movable HMD, a camera parameter CP does not necessarily need to be optimized. In the camera movable HMD, since the camera 60 is movable with respect to the optical image display sections 26 and 28, a deviation of a transformation parameter may greatly affect the display of an AR image rather than a deviation of a camera parameter, and thus a transformation parameter is preferentially optimized.

C-5. Modification Example 5

In the above-described embodiments, the display image setting section 165 displays a character image for promoting alignment on the right optical image display section 26, but various modifications can be made to a method of prompting a user to perform alignment. For example, the display image setting section 165 may output a sound of "displacement is detected" through earphones 32 and 34 to thereby prompt a user to perform alignment. In addition, various modifications can be made to the character image, and the display image setting section 165 may display an image of an arrow indicating a direction in which displacement is corrected, on the right optical image display section 26, instead of displaying the character image.

In other embodiments, various modifications can be made to a method of notifying a user of a time until imaging. For example, a display image setting section 165 may output a number indicating a time until imaging as a sound through earphones 32 and 34 to thereby notify a user of the time until imaging. In addition, the display image setting section 165 may display only a number of "3" on a right optical image display section 26, for example, during count-down to thereby notify a user of a time until imaging. In addition, the display image setting section 165 may display a straight line on the right optical image display section 26 in such a manner that the length of the straight line is reduced as time goes by, thereby expressing the length of a time until imaging.

C-6. Modification Example 6

In the above-described embodiments, calibration is executed by performing alignment twice on each of the right optical image display section 26 and the left optical image display section 28 in the first setting mode, but various modifications can be made to the number of times of alignment. The number of times of alignment is increased, and thus a parameter for executing calibration with a higher level of accuracy may be set in the optimization of each parameter using a Jacobian matrix. Hereinafter, an example of the optimization of a parameter will be described.

The number of times of alignment is set to be A, and the number of feature elements (for example, the center of a circle) of real marker MK1 or MK2 is set to be n. When the number of parameters to be adjusted with respect to a pair of a camera 60 and an image display section (in the above-described embodiments, a pair of the camera 60 and either one of the right and left optical image display sections 26 and 28) is set to be m, the total number of parameters to be optimized is M and satisfies the following Expression (22).

$$M \leq 2n \quad (22)$$

Regarding each iteration, a pseudo code of optimization is as follows. First, regarding each alignment, a Jacobian matrix Js is calculated with respect to a pair of the camera 60 and the right optical image display section 26 and a pair of the camera 60 and the left optical image display section 28. The Jacobian matrix Js can be expressed as a 2n×M matrix. Next, a 2n×1 residual matrix es is calculated. The above-mentioned process is performed on each of A alignments.

Next, the Jacobian matrix Js having a size of 4n×M is merged to a matrix J. The residual matrix es is connected thereto to thereby generate a 4n×1 matrix e. Elements of the matrix e may be expressed as Expression (12). In addition, an increase value dp of a selected parameter is calculated.

$$dp = \text{inverse}(\text{transpose}(J)*J+B)*\text{transpose}(J)*e \quad (23)$$

Here, B in Expression (23) indicates a correction matrix and is used to avoid a convergence problem in a case where transpose(J)*J in Expression (23) is not successfully adjusted. Meanwhile, in the above-mentioned expression, "inverse( )" means an inverse matrix of a matrix within parentheses, and "transpose( )" means a transposed matrix of a matrix within parentheses. Next, a parameter p is updated as in Expression (24).

$$p = p + dp \quad (24)$$

In a case where the updated parameter p satisfies termination conditions, optimization is terminated. In a case where the updated parameter does not satisfy termination conditions, optimization is iteratively performed.

C-7. Modification Example 7

In the above-described embodiments, the parameter setting section 167 also derives a camera parameter CP by optimization. However, in a case where there is less variation from a design value during manufacture, a design value may be set with respect to the camera parameter CP, and only a spatial relationship between the camera 60 and the optical image display sections 26 and 28 may be derived. In an HMD 100 according to this modification example, the number of parameters to be optimized is decreased. In addition, it is possible to reduce a time for optimizing a parameter while optimizing a parameter for making a cost function E smaller by substituting a design value for a parameter having less variation in manufacturing.

In the above-described embodiments, a marker displayed on the right optical image display section 26 and a marker displayed on the left optical image display section 28 are the same marker image IMG, but various modifications can be made to the marker image IMG and the real markers MK1 and MK2. For example, images of the markers respectively displayed on the right optical image display section 26 and the left optical image display section 28 may be different images. In addition, various modifications can be made to the marker image IMG and the real markers MK1 and MK2 in accordance with the accuracy of a parameter to be derived. For example, the number of circles included in the real marker MK1 is not limited to ten, may be greater than ten, and may be less than ten. In addition, a plurality of feature points included in the real marker MK1 may not be the center of the circle, and may be simply the center of gravity of a triangle. In addition, a plurality of straight lines, which are not parallel to each other, may be formed within the real marker MK1, and intersections between the straight lines may be specified as a plurality of feature points. In addition, the marker image IMG and the real markers MK1 and MK2 may be different markers. In a case where a marker image and a real marker are superposed on each other, various modifications can be made to the marker image and the real marker in a range in which a user visually perceives the superposed portion. For example, alignment may be performed on a rectangular marker image so that the center of a real marker which is a substantially perfect circle is aligned with the center of the marker image.

In the above-described embodiments, in a case where a camera parameter CP of the camera 60 is optimized, focal lengths (Fx, Fy) and camera principal point positions (center positions of a captured image) (Cx, Cy) are optimized. Instead of these or together with this, one of distortion coefficients may be optimized as the camera parameter CP of the camera 60.

C-8. Modification Example 8

The following additional constraint conditions may be added to the cost function of Expression (15) defined in the above-described embodiment. Alignment by the visual observation of a user US is separately performed with respect to each of optical image display sections 26 and 28, and thus the alignment errors thereof are not necessarily the same as each other. For this reason, among two translations of a camera 60 with respect to the right and left optical image display sections 26 and 28, the estimation of a Ty component may greatly varies between the optical image display sections 26 and 28. In a case where two Ty components are greatly different from each other, a user experiences a fusion problem of a stereoscopic view. Since a maximum difference in a translation Ty between the camera 60 and the optical image display sections 26 and 28 is a predetermined finite value, a function defined as in the following Expression (25) as a function of an absolute value of a difference between right and left Ty may be added to Expression (15). In a case where Expression (25) is added to Expression (15), Expression (15) is then introduced into the following Expression (26).

$$\text{abs}(T_{y\_}\text{left} - T_{y\_}\text{right}) \quad (25)$$

$$\frac{1}{\exp\left(-\frac{(ds-ts)^2}{2d^2}\right)} \quad (26)$$

Here, elements included in Expression (26) are expressed as the following Expression (27) to Expression (29).

$$ds = (T_{y\_}\text{left} - T_{y\_}\text{right})^2 \quad (27)$$

$$ts = (\text{acceptable difference})^2 \quad (28)$$

$$d^2 = (\text{maximum difference})^2 - (\text{acceptable difference}) \quad (29)$$

In the above-mentioned Expression (28) and Expression (29), "acceptable difference" is an allowable Ty difference, and "maximum difference" is a maximum value of an estimated Ty difference.

Expression (15) is as follows.

$$E = E_L + E_R + 1 \Big/ \exp\left(-\frac{(ds-ts)^2}{2d^2}\right) \quad (30)$$

Here, "acceptable difference" and "maximum difference" may be empirically set. In addition, when a difference between Ty_left and Ty_right is large, a cost function E increases. For this reason, the cost function E approximates a global minimum while a variable p (particularly, a right Ty_right and a left Ty_left) is forced so as to fall within a request range. In the calculation of optimization, a new row (horizontal row of a matrix) is added to a Jacobian matrix J, and an e matrix is generated in iteration steps of the optimization. An error calculated from the above-mentioned function is added to the end of the e matrix. The new row in the Jacobian matrix J takes a value of zero with respect to all parameters except for Ty_left and Ty_right. In addition, entries (initial values) corresponding to the two parameters may be set to 1 and −1, respectively.

According to the embodiments described above, the HMD 100 includes the CPU 140 as a single processor, however according to another embodiment, the HMD 100 may include one or more processors, and the processes and/or methods described in the embodiments may be implemented by respective processors.

The invention is not limited to the above-described embodiments and modification examples, but various configurations can be realized without departing from the scope of the invention. For example, the technical features in the embodiments and modification examples which correspond to the technical features of the respective aspects described in Summary can be appropriately replaced or combined with each other, in order to solve a portion or all of the above-described problems or in order to achieve a portion or all of the above-described effects. The technical features can be appropriately deleted unless the technical features are described as essential herein.

The entire disclosure of Japanese Patent Application No. 2016-077136, filed on Apr. 7, 2016, is expressly incorporated by reference herein.

What is claimed is:

1. A head-mounted display device comprising a transparent type image display, a camera, a depth sensor and a controller, wherein the controller:
    derives an object distance of a real object using data from the depth sensor;
    derives an object pose of the real object with respect to the camera using an image from the camera;
    selects a parameter group from among a plurality of predetermined parameter groups in response to the derived object distance, the plurality of parameter groups including respective transformation parameters between the image display and the camera derived by calibration based on images captured by the camera upon alignment between (i) a marker image displayed on the image display and (ii) a marker placed at different distances from the image display, the alignment being made by a user wearing the head-mounted display device; and
    causes to be displayed, on the image display, an AR image by 3D rendering based at least on the derived object pose and the selected parameter group, thereby allowing a user to perceive the AR image through the image display, an object pose of the AR image being consistent with the object pose of the real object.

2. The head-mounted display device according to claim 1, wherein the image display includes a left eye image display and a right eye image display, and
    the controller causes to be displayed, on the left eye image display and the right eye image display, images so as to allow the user to visually perceive the AR image as a stereoscopic image.

3. The head-mounted display device according to claim 1, wherein the plurality of parameter groups include a first parameter group and a second parameter group, the first parameter group being set so as to be used in a case where a distance between the image display and the real object that is based on the object distance is less than 4 m, and the second parameter group being set so as to be used in a case where the distance between the image display and the real object is equal to or greater than 4 m.

4. The head-mounted display device according to claim 1, wherein the plurality of parameter groups include a first parameter group and a second parameter group, the first parameter group being set so as to be used in a case where a distance between the image display and the real object that is based on the object distance is less than 1 m, and the second parameter group being set so as to be used in a case where the distance between the image display and the real object is equal to or greater than 1 m.

5. A non-transitory storage medium on which is recorded a computer program for a head-mounted display device including a transparent type image display, a camera, a depth sensor and a controller, the computer program causing the controller in the head-mounted display device to:

derive an object distance of a real object using data from the depth sensor;

derive an object pose of the real object with respect to the camera using an image from the camera;

select a parameter group from among a plurality of predetermined parameter groups in response to the derived object distance, the plurality of parameter groups including respective transformation parameters between the image display and the camera derived by calibration based on images captured by the camera upon alignment between (i) a marker image displayed on the image display and (ii) a marker placed at different distances from the image display, the alignment being made by a user wearing the head-mounted display device; and cause to be displayed, on the image display, an AR image by 3D rendering based at least on the derived object pose and the selected parameter group, thereby allowing a user to perceive the AR image through the image display, an object pose of the AR image being consistent with the object pose of the real object.

6. The head-mounted display device according to claim 2, wherein the plurality of parameter groups include a first parameter group and a second parameter group, the first parameter group being set so as to be used in a case where a distance between the image display and the real object that is based on the object distance is less than 4 m, and the second parameter group being set so as to be used in a case where the distance between the image display and the real object is equal to or greater than 4 m.

7. The head-mounted display device according to claim 2, wherein the plurality of parameter groups include a first parameter group and a second parameter group, the first parameter group being set so as to be used in a case where a distance between the image display and the real object that is based on the object distance is less than 1 m, and the second parameter group being set so as to be used in a case where the distance between the image display and the real object is equal to or greater than 1 m.

8. A method for a head-mounted display device comprising a transparent type image display, a camera, a depth sensor and a controller, the method comprising:

deriving an object distance of a real object using data from the depth sensor;

deriving an object pose of the real object with respect to the camera using an image from the camera;

selecting a parameter group from among a plurality of predetermined parameter groups in response to the derived object distance, the plurality of parameter groups including respective transformation parameters between the image display and the camera derived by calibration based on images captured by the camera upon alignment between (i) a marker image displayed on the image display and (ii) a marker placed at different distances from the image display, the alignment being made by a user wearing the head-mounted display device; and causing to be displayed, on the image display, an AR image by 3D rendering based at least on the derived object pose and the selected parameter group, thereby allowing a user to perceive the AR image through the image display, an object pose of the AR image being consistent with the object pose of the real object.

* * * * *